US012587337B2

(12) United States Patent
Hasanzadezonuzy et al.

(10) Patent No.: US 12,587,337 B2
(45) Date of Patent: Mar. 24, 2026

(54) DYNAMIC INDICATION OF TRACKING REFERENCE SIGNAL

(71) Applicant: QUALCOMM Incorporated, San Diego, CA (US)

(72) Inventors: Aria Hasanzadezonuzy, Somerville, NJ (US); Navid Abedini, Basking Ridge, NJ (US); Jianghong Luo, Skillman, NJ (US); Naeem Akl, Bridgewater, NJ (US); Konstantinos Dimou, New York, NY (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 17/951,629

(22) Filed: Sep. 23, 2022

(65) Prior Publication Data

US 2024/0106600 A1      Mar. 28, 2024

(51) Int. Cl.
  *H04L 5/00*          (2006.01)
  *H04W 24/10*       (2009.01)
  *H04W 68/00*       (2009.01)
(52) U.S. Cl.
  CPC ........... *H04L 5/0051* (2013.01); *H04W 24/10* (2013.01); *H04W 68/005* (2013.01)

(58) Field of Classification Search
  None
  See application file for complete search history.

(56) References Cited

U.S. PATENT DOCUMENTS

| | | | |
|---|---|---|---|
| 2021/0359828 A1* | 11/2021 | Levitsky | H04L 25/0222 |
| 2024/0080152 A1* | 3/2024 | Shrivastava | H04W 52/0235 |
| 2024/0163790 A1* | 5/2024 | Nagano | H04W 56/00 |
| 2025/0031189 A1* | 1/2025 | Hwang | H04L 5/0053 |

* cited by examiner

*Primary Examiner* — Scott M Sciacca
(74) *Attorney, Agent, or Firm* — Holland & Hart LLP

(57) ABSTRACT

Methods, systems, and devices for dynamic indication of tracking references signal (TRS) and wireless communications are described. A user equipment (UE) that is operating in a first operating mode may receive one or more TRS parameters from a network entity for the UE to perform channel measurements associated with one or more TRSs. The UE may receive a dynamic paging indicator message that indicates a set of updated TRS parameters. The dynamic paging indicator may include at least one TRS parameter that is different from the one or more TRS parameters. The UE may then receive one or more TRSs, and may perform channel measurement in accordance with the set of updated TRS parameters.

30 Claims, 20 Drawing Sheets

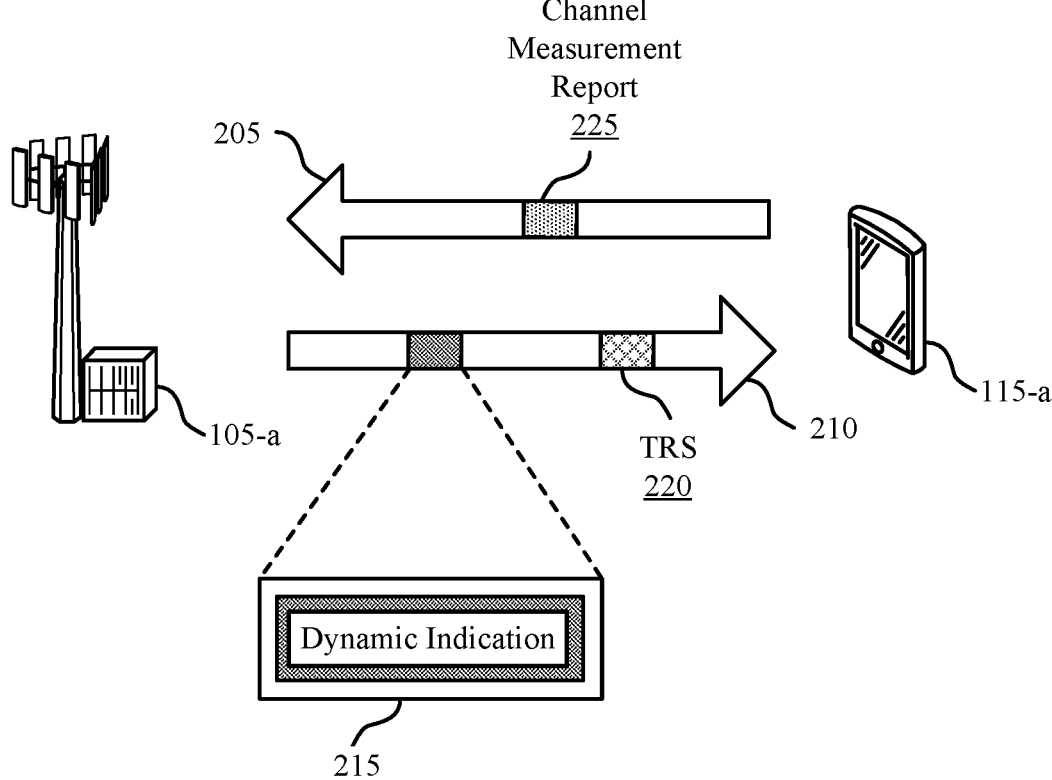
Channel
Measurement
Report
225
205
105-a
TRS
220
210
115-a
Dynamic Indication
215
200
FIG. 2

Channel
Measurement
Report
425

105-c

TRS
420

115-c

Duration
410

Range
415

Dynamic Indication
405

400

605

600

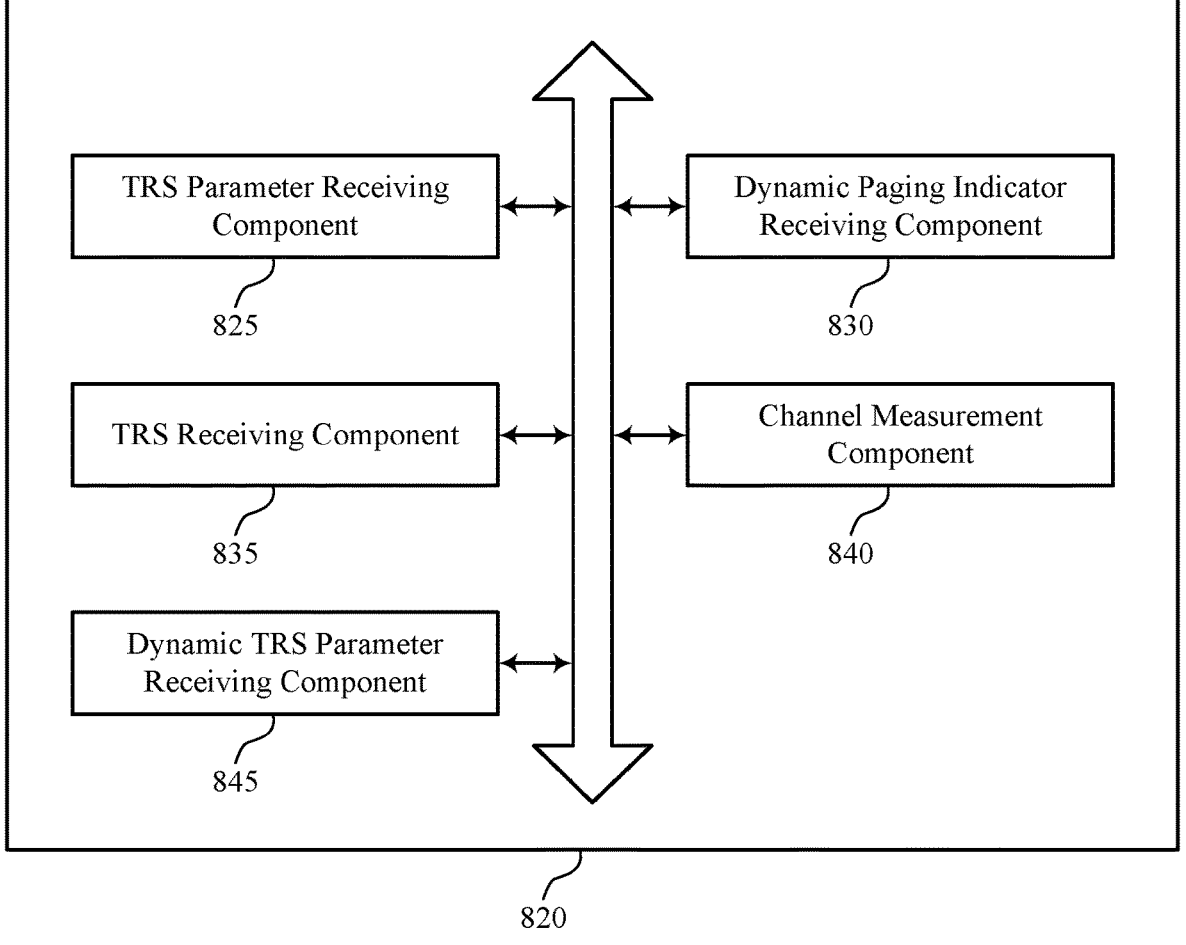
TRS Parameter Receiving Component
825
Dynamic Paging Indicator Receiving Component
830
TRS Receiving Component
835
Channel Measurement Component
840
Dynamic TRS Parameter Receiving Component
845
820
800
FIG. 8

1010     1020     1015

1005

1000

130

105

115

Network
Entity

Transceiver

1310

Antenna

1315

Communications
Manager

1320

Memory

Code

1330

1325

1340

Processor

1335

1305

1300

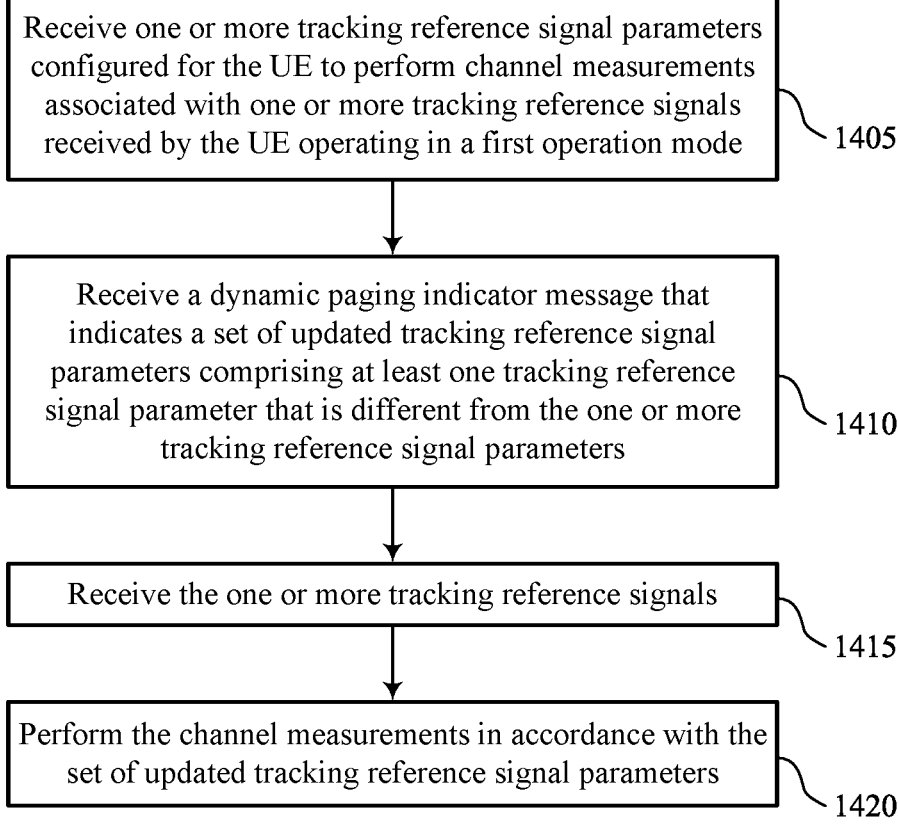

Receive one or more tracking reference signal parameters configured for the UE to perform channel measurements associated with one or more tracking reference signals received by the UE operating in a first operation mode

1405

Receive a dynamic paging indicator message that indicates a set of updated tracking reference signal parameters comprising at least one tracking reference signal parameter that is different from the one or more tracking reference signal parameters

1410

Receive the one or more tracking reference signals

1415

Perform the channel measurements in accordance with the set of updated tracking reference signal parameters

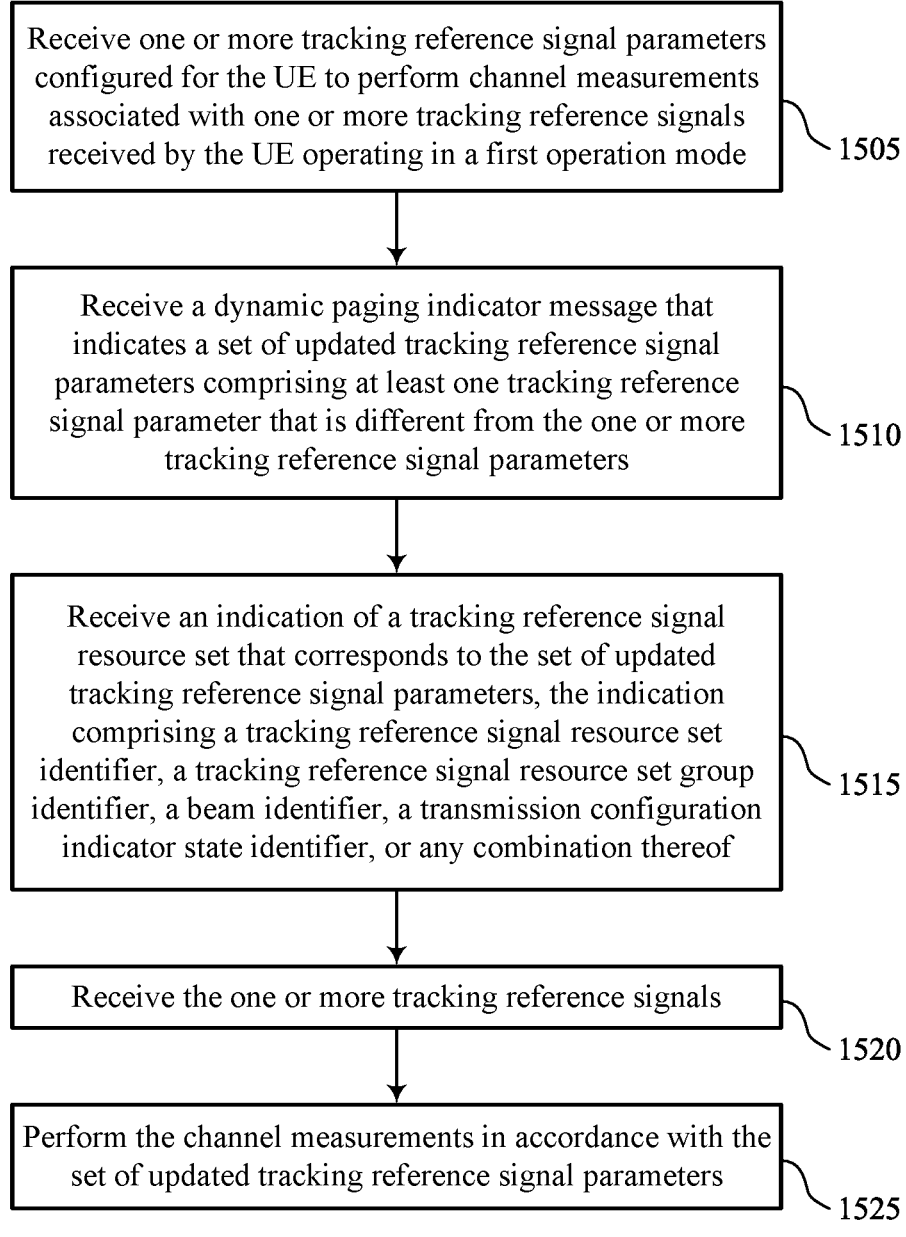

Receive one or more tracking reference signal parameters configured for the UE to perform channel measurements associated with one or more tracking reference signals received by the UE operating in a first operation mode

1505

Receive a dynamic paging indicator message that indicates a set of updated tracking reference signal parameters comprising at least one tracking reference signal parameter that is different from the one or more tracking reference signal parameters

1510

Receive an indication of a tracking reference signal resource set that corresponds to the set of updated tracking reference signal parameters, the indication comprising a tracking reference signal resource set identifier, a tracking reference signal resource set group identifier, a beam identifier, a transmission configuration indicator state identifier, or any combination thereof

1515

Receive the one or more tracking reference signals

1520

Perform the channel measurements in accordance with the set of updated tracking reference signal parameters

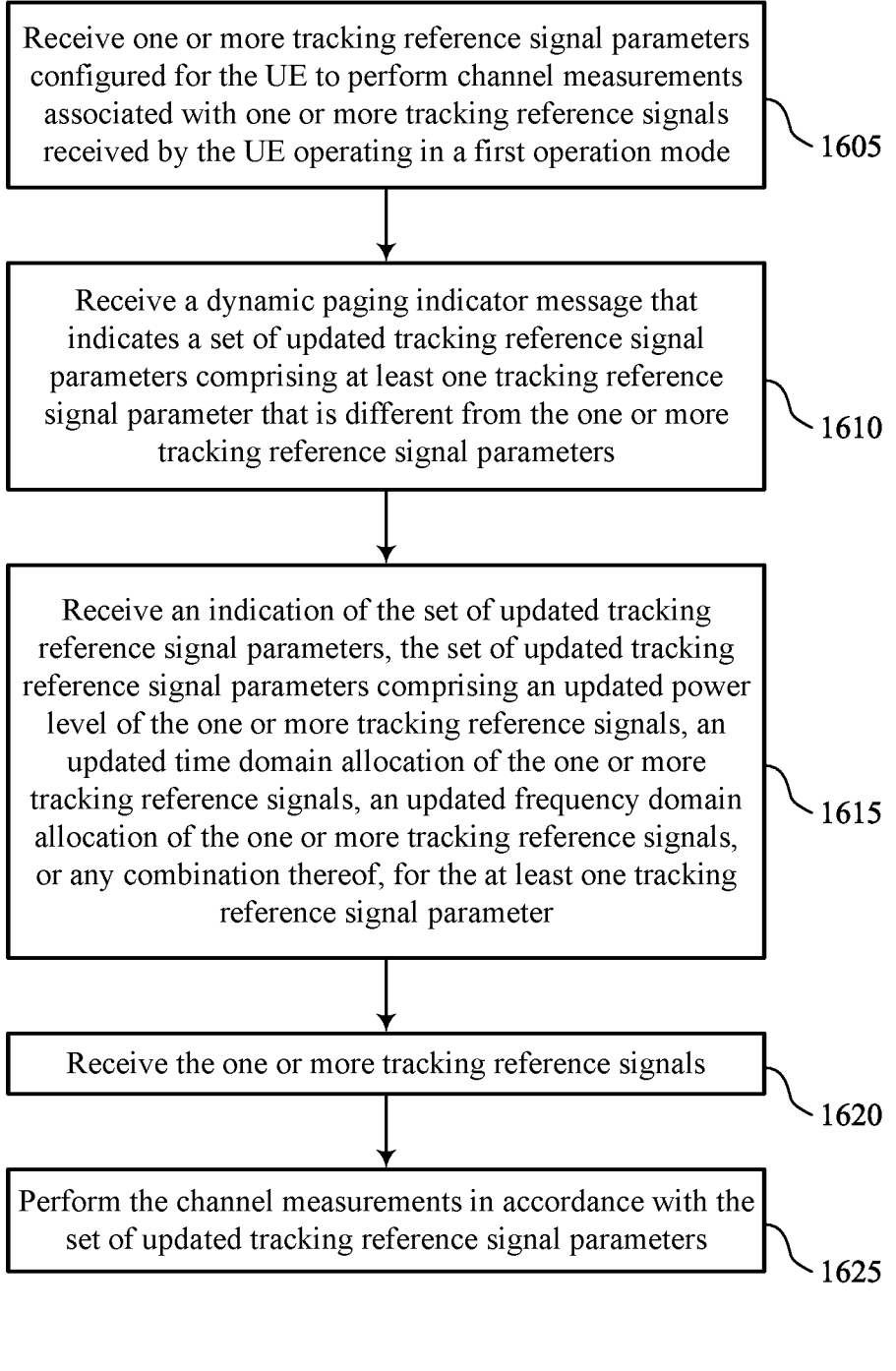

Receive one or more tracking reference signal parameters configured for the UE to perform channel measurements associated with one or more tracking reference signals received by the UE operating in a first operation mode

1605

Receive a dynamic paging indicator message that indicates a set of updated tracking reference signal parameters comprising at least one tracking reference signal parameter that is different from the one or more tracking reference signal parameters

1610

Receive an indication of the set of updated tracking reference signal parameters, the set of updated tracking reference signal parameters comprising an updated power level of the one or more tracking reference signals, an updated time domain allocation of the one or more tracking reference signals, an updated frequency domain allocation of the one or more tracking reference signals, or any combination thereof, for the at least one tracking reference signal parameter

1615

Receive the one or more tracking reference signals

1620

Perform the channel measurements in accordance with the set of updated tracking reference signal parameters

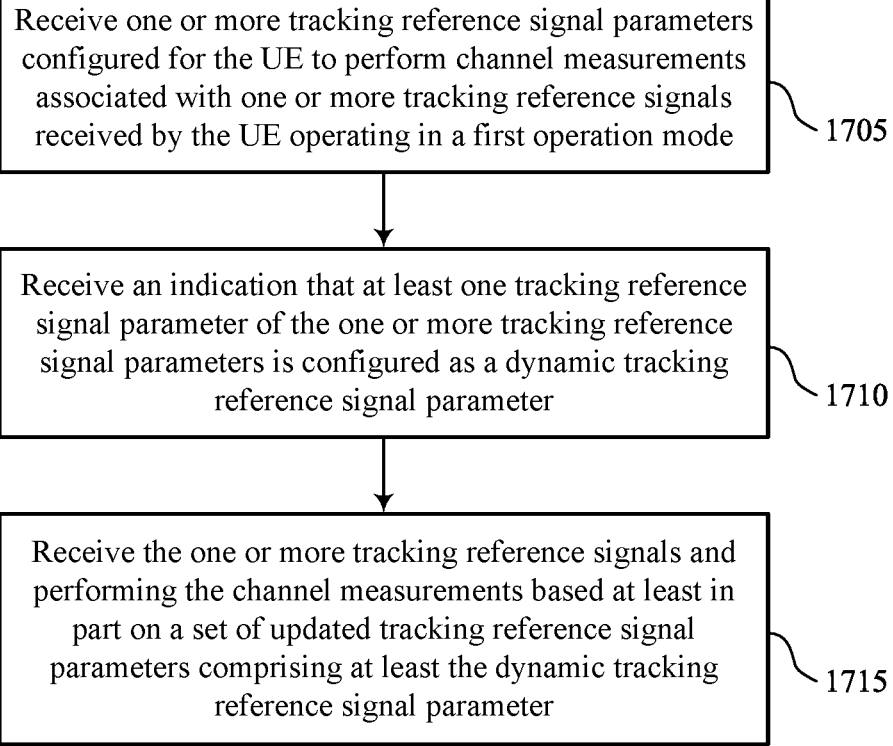

Receive one or more tracking reference signal parameters configured for the UE to perform channel measurements associated with one or more tracking reference signals received by the UE operating in a first operation mode

1705

Receive an indication that at least one tracking reference signal parameter of the one or more tracking reference signal parameters is configured as a dynamic tracking reference signal parameter

1710

Receive the one or more tracking reference signals and performing the channel measurements based at least in part on a set of updated tracking reference signal parameters comprising at least the dynamic tracking reference signal parameter

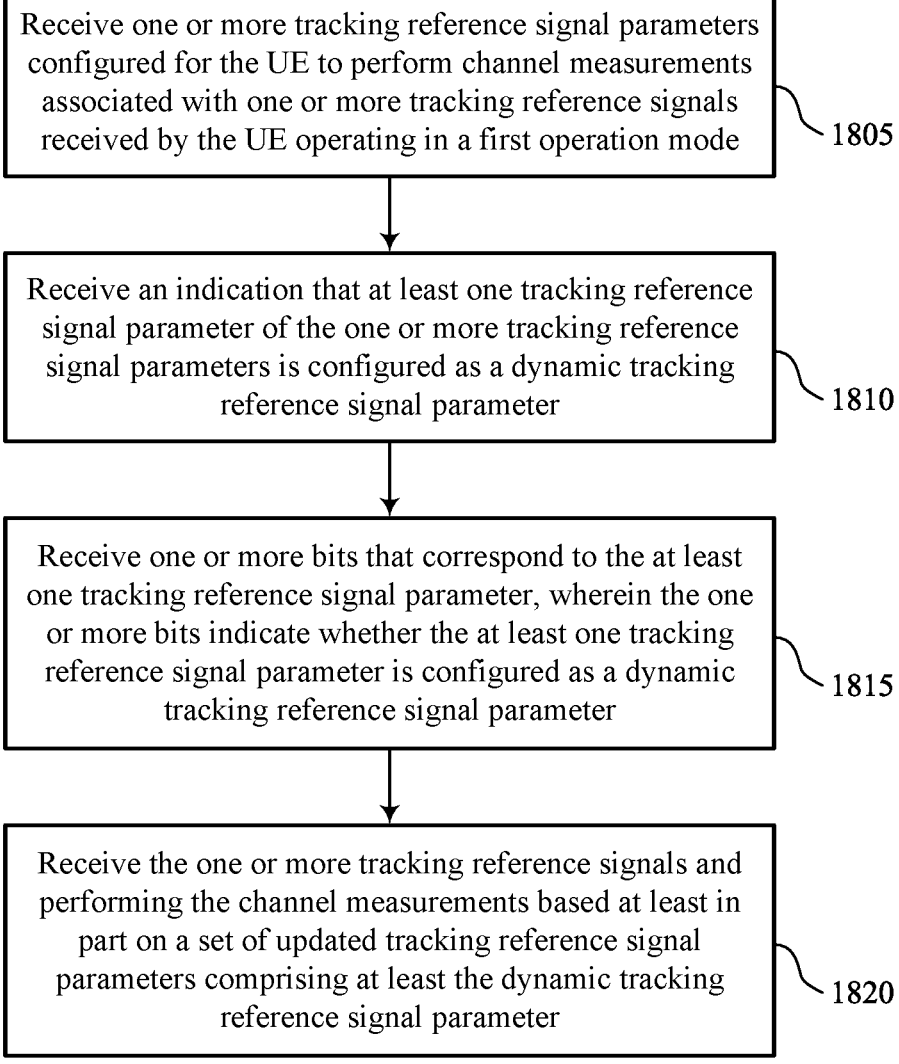

Receive one or more tracking reference signal parameters configured for the UE to perform channel measurements associated with one or more tracking reference signals received by the UE operating in a first operation mode ⟩ 1805

Receive an indication that at least one tracking reference signal parameter of the one or more tracking reference signal parameters is configured as a dynamic tracking reference signal parameter ⟩ 1810

Receive one or more bits that correspond to the at least one tracking reference signal parameter, wherein the one or more bits indicate whether the at least one tracking reference signal parameter is configured as a dynamic tracking reference signal parameter ⟩ 1815

Receive the one or more tracking reference signals and performing the channel measurements based at least in part on a set of updated tracking reference signal parameters comprising at least the dynamic tracking reference signal parameter ⟩ 1820

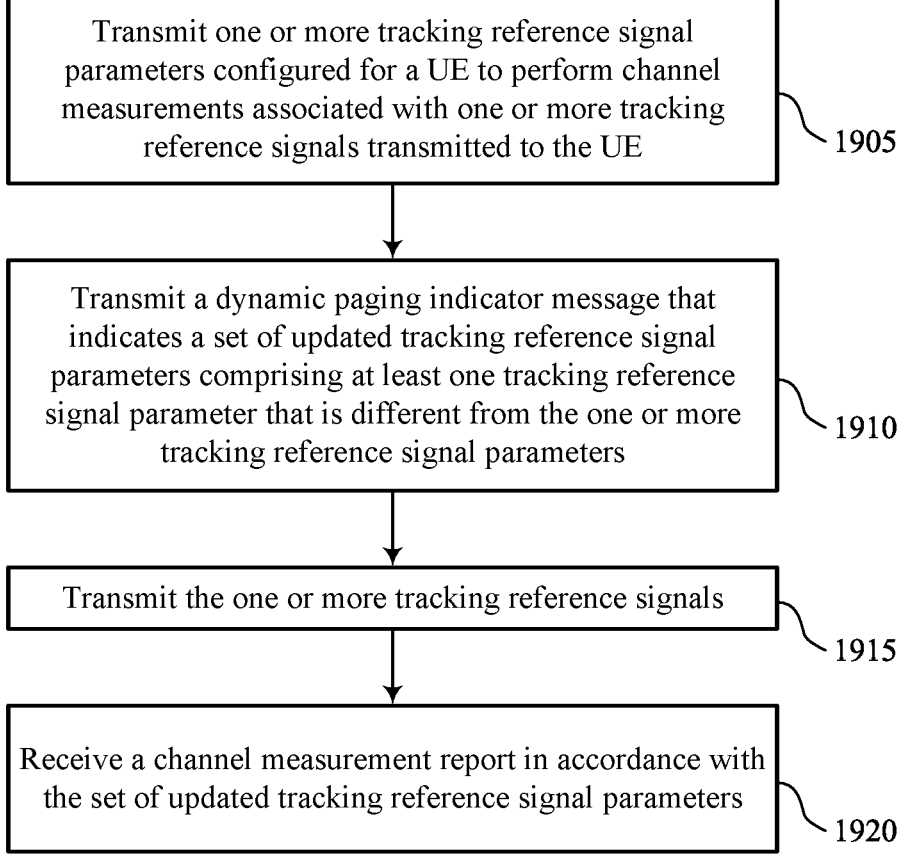

Transmit one or more tracking reference signal parameters configured for a UE to perform channel measurements associated with one or more tracking reference signals transmitted to the UE

1905

Transmit a dynamic paging indicator message that indicates a set of updated tracking reference signal parameters comprising at least one tracking reference signal parameter that is different from the one or more tracking reference signal parameters

1910

Transmit the one or more tracking reference signals

1915

Receive a channel measurement report in accordance with the set of updated tracking reference signal parameters

DYNAMIC INDICATION OF TRACKING REFERENCE SIGNAL

TECHNICAL FIELD

The following relates to wireless communications, including dynamic indication of tracking reference signal (TRS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support dynamic indication of tracking reference signal (TRS). In some examples, a network entity may dynamically indicate TRS parameters to a user equipment (UE) operating in an idle mode, an inactive mode, or a connected mode. In some other examples, the network entity may indicate to the UE that the TRS parameters are dynamic or are otherwise configured to dynamically change. For example, the network entity may dynamically indicate TRS parameters using control signaling such as a dynamic paging indicator (e.g., paging early indication (PEI)), a paging downlink control information (DCI), or both. In such cases, the network may extend the existing dynamic paging indicator or paging DCI to include additional information about changing TRS parameters and TRS resource set(s) using a bitmap or a list. In some other examples, the network entity may notify the UE that one or more TRS parameters may change in the future, for instance, during a given interval or time duration, and the one or more TRS parameters may be between a range of configured TRS parameter values.

A method for wireless communication at a UE is described. The method may include receiving one or more TRS parameters configured for the UE to perform channel measurements associated with one or more TRSs received by the UE operating in a first operation mode, receiving a dynamic paging indicator message that indicates a set of updated TRS parameters including at least one TRS parameter that is different from the one or more TRS parameters, receiving the one or more TRSs, and performing the channel measurements in accordance with the set of updated TRS parameters.

An apparatus for wireless communication at a UE is described. The apparatus may include at least one processor, and memory coupled to the at least one processor, the memory storing instructions executable by the processor to cause the UE to receive one or more TRS parameters configured for the UE to perform channel measurements associated with one or more TRSs received by the UE operating in a first operation mode, receive a dynamic paging indicator message that indicates a set of updated TRS parameters including at least one TRS parameter that is different from the one or more TRS parameters, receive the one or more TRSs, and perform the channel measurements in accordance with the set of updated TRS parameters.

Another apparatus for wireless communication at a UE is described. The apparatus may include means for receiving one or more TRS parameters configured for the UE to perform channel measurements associated with one or more TRSs received by the UE operating in a first operation mode, means for receiving a dynamic paging indicator message that indicates a set of updated TRS parameters including at least one TRS parameter that is different from the one or more TRS parameters, means for receiving the one or more TRSs, and means for performing the channel measurements in accordance with the set of updated TRS parameters.

A non-transitory computer-readable medium storing code for wireless communication at a UE is described. The code may include instructions executable by a processor to receive one or more TRS parameters configured for the UE to perform channel measurements associated with one or more TRSs received by the UE operating in a first operation mode, receive a dynamic paging indicator message that indicates a set of updated TRS parameters including at least one TRS parameter that is different from the one or more TRS parameters, receive the one or more TRSs, and perform the channel measurements in accordance with the set of updated TRS parameters.

In some examples of the method, apparatuses, and non-transitory computer-readable medium described herein, receiving the dynamic paging indicator message may include operations, features, means, or instructions for receiving an indication of a TRS resource set that corresponds to the set of updated TRS parameters, the indication including a TRS resource set identifier, a TRS resource set group identifier, a beam identifier, a transmission configuration indicator (TCI) state identifier, or any combination thereof.

In some examples of the method, apparatuses, and non-transitory computer-readable medium described herein, receiving the dynamic paging indicator message may include operations, features, means, or instructions for receiving an indication of the set of updated TRS parameters, the set of updated TRS parameters including an updated power level of the one or more TRSs, an updated time domain allocation of the one or more TRSs, an updated frequency domain allocation of the one or more TRSs, or any combination thereof, for the at least one TRS parameter.

In some examples of the method, apparatuses, and non-transitory computer-readable medium described herein, receiving the dynamic paging indicator message may include operations, features, means, or instructions for receiving, via a bitmap, an indication of a TRS resource set that corresponds to the set of updated TRS parameters including the at least one TRS parameter that may be different from the one or more TRS parameters.

In some examples of the method, apparatuses, and non-transitory computer-readable medium described herein, a first bit of the bitmap corresponds to the at least one TRS parameter that may be different from the one or more TRS parameters, and a second bit of the bitmap indicates the TRS resource set that includes the at least one TRS parameter.

In some examples of the method, apparatuses, and non-transitory computer-readable medium described herein, receiving the dynamic paging indicator message may include operations, features, means, or instructions for receiving, via a list, an indication of a TRS resource set that corresponds to the set of updated TRS parameters including the at least one TRS parameter that may be different from the one or more TRS parameters.

In some examples of the method, apparatuses, and non-transitory computer-readable medium described herein, each row of the list includes a first set of bits that indicate the TRS resource set that includes the at least one TRS parameter, and a second set of bits that indicates the at least one TRS parameter that may be different from the one or more TRS parameters.

Some examples of the method, apparatuses, and non-transitory computer-readable medium described herein may further include operations, features, means, or instructions for receiving the dynamic paging indicator message before a paging occasion of a discontinuous reception (DRX) cycle of the UE.

In some examples of the method, apparatuses, and non-transitory computer-readable medium described herein, the first operation mode includes an idle operation mode or an inactive operation mode and the method, apparatuses, and non-transitory computer-readable medium may include further operations, features, means, or instructions for receiving the dynamic paging indicator message via a paging early indication message, a paging DCI message, or both.

In some examples of the method, apparatuses, and non-transitory computer-readable medium described herein, the first operation mode includes a connected mode and the method, apparatuses, and non-transitory computer-readable medium may include further operations, features, means, or instructions for receiving the dynamic paging indicator message via a unicast DCI message, a group-common DCI message, a multicast medium access control-control element (MAC-CE), a unicast MAC-CE, or any combination thereof.

A method for wireless communication at a UE is described. The method may include receiving one or more TRS parameters configured for the UE to perform channel measurements associated with one or more TRSs received by the UE operating in a first operation mode, receiving an indication that at least one TRS parameter of the one or more TRS parameters is configured as a dynamic TRS parameter, and receiving the one or more TRSs and performing the channel measurements based on a set of updated TRS parameters including at least the dynamic TRS parameter.

An apparatus for wireless communication at a UE is described. The apparatus may include at least one processor, and memory coupled to the at least one processor, the memory storing instructions executable by the processor to cause the UE to receive one or more TRS parameters configured for the UE to perform channel measurements associated with one or more TRSs received by the UE operating in a first operation mode, receive an indication that at least one TRS parameter of the one or more TRS parameters is configured as a dynamic TRS parameter, and receive the one or more TRSs and perform the channel measurements based on a set of updated TRS parameters including at least the dynamic TRS parameter.

Another apparatus for wireless communication at a UE is described. The apparatus may include means for receiving one or more TRS parameters configured for the UE to perform channel measurements associated with one or more TRSs received by the UE operating in a first operation mode, means for receiving an indication that at least one TRS parameter of the one or more TRS parameters is configured as a dynamic TRS parameter, and means for receiving the one or more TRSs and performing the channel measurements based on a set of updated TRS parameters including at least the dynamic TRS parameter.

A non-transitory computer-readable medium storing code for wireless communication at a UE is described. The code may include instructions executable by a processor to receive one or more TRS parameters configured for the UE to perform channel measurements associated with one or more TRSs received by the UE operating in a first operation mode, receive an indication that at least one TRS parameter of the one or more TRS parameters is configured as a dynamic TRS parameter, and receive the one or more TRSs and perform the channel measurements based on a set of updated TRS parameters including at least the dynamic TRS parameter.

Some examples of the method, apparatuses, and non-transitory computer-readable medium described herein may further include operations, features, means, or instructions for receiving one or more bits that correspond to the at least one TRS parameter, where the one or more bits indicate whether the at least one TRS parameter may be configured as a dynamic TRS parameter.

In some examples of the method, apparatuses, and non-transitory computer-readable medium described herein, receiving the indication may include operations, features, means, or instructions for receiving a validity parameter associated with the at least one TRS parameter, where the validity parameter indicates a duration of time that the at least one TRS parameter may be configured as a dynamic TRS parameter.

In some examples of the method, apparatuses, and non-transitory computer-readable medium described herein, receiving the indication may include operations, features, means, or instructions for receiving a range parameter associated with the at least one TRS parameter, where the range parameter indicates a range of values available for the dynamic TRS parameter.

In some examples of the method, apparatuses, and non-transitory computer-readable medium described herein, receiving the one or more TRSs and performing the channel measurements may include operations, features, means, or instructions for performing one or more power delay profile measurements by excluding one or more measurements associated with the dynamic TRS parameter.

In some examples of the method, apparatuses, and non-transitory computer-readable medium described herein, the dynamic TRS parameter indicates a change in a power level of one or more the one or more TRSs.

Some examples of the method, apparatuses, and non-transitory computer-readable medium described herein may further include operations, features, means, or instructions for receiving the indication of the dynamic TRS parameter via a system information block.

Some examples of the method, apparatuses, and non-transitory computer-readable medium described herein may further include operations, features, means, or instructions for receiving the indication of the dynamic TRS parameter via a radio resource control (RRC) message.

A method for wireless communication at a network entity is described. The method may include transmitting one or more TRS parameters configured for a UE to perform channel measurements associated with one or more TRSs transmitted to the UE, transmitting a dynamic paging indicator message that indicates a set of updated TRS parameters including at least one TRS parameter that is different from the one or more TRS parameters, transmitting the one or more TRSs, and receiving a channel measurement report (CMR) in accordance with the set of updated TRS parameters.

An apparatus for wireless communication at a network entity is described. The apparatus may include at least one processor, and memory coupled to the at least one processor, the memory storing instructions executable by the processor to cause the network entity to transmit one or more TRS parameters configured for a UE to perform channel measurements associated with one or more TRSs transmitted to the UE, transmit a dynamic paging indicator message that indicates a set of updated TRS parameters including at least one TRS parameter that is different from the one or more TRS parameters, transmit the one or more TRSs, and receive a CMR in accordance with the set of updated TRS parameters.

Another apparatus for wireless communication at a network entity is described. The apparatus may include means for transmitting one or more TRS parameters configured for a UE to perform channel measurements associated with one or more TRSs transmitted to the UE, means for transmitting a dynamic paging indicator message that indicates a set of updated TRS parameters including at least one TRS parameter that is different from the one or more TRS parameters, means for transmitting the one or more TRSs, and means for receiving a CMR in accordance with the set of updated TRS parameters.

A non-transitory computer-readable medium storing code for wireless communication at a network entity is described. The code may include instructions executable by a processor to transmit one or more TRS parameters configured for a UE to perform channel measurements associated with one or more TRSs transmitted to the UE, transmit a dynamic paging indicator message that indicates a set of updated TRS parameters including at least one TRS parameter that is different from the one or more TRS parameters, transmit the one or more TRSs, and receive a CMR in accordance with the set of updated TRS parameters.

In some examples of the method, apparatuses, and non-transitory computer-readable medium described herein, transmitting the dynamic paging indicator message may include operations, features, means, or instructions for transmitting an indication of a TRS resource set that corresponds to the set of updated TRS parameters, the indication including a TRS resource set identifier, a TRS resource set group identifier, a beam identifier, a TCI state identifier, or any combination thereof.

In some examples of the method, apparatuses, and non-transitory computer-readable medium described herein, transmitting the dynamic paging indicator message may include operations, features, means, or instructions for transmitting an indication of the set of updated TRS parameters, the set of updated TRS parameters including an updated power level of the one or more TRSs, an updated time domain allocation of the one or more TRSs, an updated frequency domain allocation of the one or more TRSs, or any combination thereof, for the at least one TRS parameter.

In some examples of the method, apparatuses, and non-transitory computer-readable medium described herein, transmitting the dynamic paging indicator message may include operations, features, means, or instructions for transmitting, via a bitmap, an indication of a TRS resource set that corresponds to the set of updated TRS parameters including the at least one TRS parameter that may be different from the one or more TRS parameters.

In some examples of the method, apparatuses, and non-transitory computer-readable medium described herein, a first bit of the bitmap corresponds to the at least one TRS parameter that may be different from the one or more TRS parameters, and a second bit of the bitmap indicates the TRS resource set that includes the at least one TRS parameter.

In some examples of the method, apparatuses, and non-transitory computer-readable medium described herein, transmitting the dynamic paging indicator message may include operations, features, means, or instructions for transmitting, via a list, an indication of a TRS resource set that corresponds to the set of updated TRS parameters including the at least one TRS parameter that may be different from the one or more TRS parameters.

In some examples of the method, apparatuses, and non-transitory computer-readable medium described herein, each row of the list includes a first set of bits that indicate the TRS resource set that includes the at least one TRS parameter, and a second set of bits that indicates the at least one TRS parameter that may be different from the one or more TRS parameters.

Some examples of the method, apparatuses, and non-transitory computer-readable medium described herein may further include operations, features, means, or instructions for transmitting the dynamic paging indicator message via a paging early indication message, a paging DCI message, a unicast DCI message, a group-common DCI message, a multicast MAC-CE, a unicast MAC-CE, or any combination thereof.

A method for wireless communication at a network entity is described. The method may include transmitting one or more TRS parameters configured for a UE to perform channel measurements associated with one or more TRSs transmitted to UE, transmitting an indication that at least one TRS parameter of the one or more TRS parameters is configured as a dynamic TRS parameter, transmitting the one or more TRSs, and receiving a CMR based on a set of updated TRS parameters including at least the dynamic TRS parameter.

An apparatus for wireless communication at a network entity is described. The apparatus may include at least one processor, and memory coupled to the at least one processor, the memory storing instructions executable by the processor to cause the network entity to transmit one or more TRS parameters configured for a UE to perform channel measurements associated with one or more TRSs transmitted to UE, transmit an indication that at least one TRS parameter of the one or more TRS parameters is configured as a dynamic TRS parameter, transmit the one or more TRSs, and receive a CMR based on a set of updated TRS parameters including at least the dynamic TRS parameter.

Another apparatus for wireless communication at a network entity is described. The apparatus may include means for transmitting one or more TRS parameters configured for a UE to perform channel measurements associated with one or more TRSs transmitted to UE, means for transmitting an indication that at least one TRS parameter of the one or more TRS parameters is configured as a dynamic TRS parameter, means for transmitting the one or more TRSs, and means for receiving a CMR based on a set of updated TRS parameters including at least the dynamic TRS parameter.

A non-transitory computer-readable medium storing code for wireless communication at a network entity is described. The code may include instructions executable by a processor to transmit one or more TRS parameters configured for a UE to perform channel measurements associated with one or more TRSs transmitted to UE, transmit an indication that at least one TRS parameter of the one or more TRS parameters is configured as a dynamic TRS parameter, transmit the one or more TRSs, and receive a CMR based on a set of updated TRS parameters including at least the dynamic TRS parameter.

Some examples of the method, apparatuses, and non-transitory computer-readable medium described herein may further include operations, features, means, or instructions for transmitting one or more bits that correspond to the at least one TRS parameter, where the one or more bits indicate whether the at least one TRS parameter may be configured as a dynamic TRS parameter.

In some examples of the method, apparatuses, and non-transitory computer-readable medium described herein, transmitting the indication may include operations, features, means, or instructions for transmitting a validity parameter associated with the at least one TRS parameter, where the validity parameter indicates a duration of time that the at least one TRS parameter may be configured as a dynamic TRS parameter.

In some examples of the method, apparatuses, and non-transitory computer-readable medium described herein, transmitting the indication may include operations, features, means, or instructions for transmitting a range parameter associated with the at least one TRS parameter, where the range parameter indicates a range of values available for the dynamic TRS parameter.

BRIEF DESCRIPTION OF THE DRAWINGS

FIGS. 1-4 illustrates examples of wireless communications systems that support dynamic indication of tracking reference signal (TRS) in accordance with one or more aspects of the present disclosure.

FIG. 8 shows a block diagram of a communications manager that supports dynamic indication of TRS in accordance with one or more aspects of the present disclosure.

FIGS. 14 through 20 show flowcharts illustrating methods that support dynamic indication of TRS in accordance with one or more aspects of the present disclosure.

DETAILED DESCRIPTION

Figure 1:
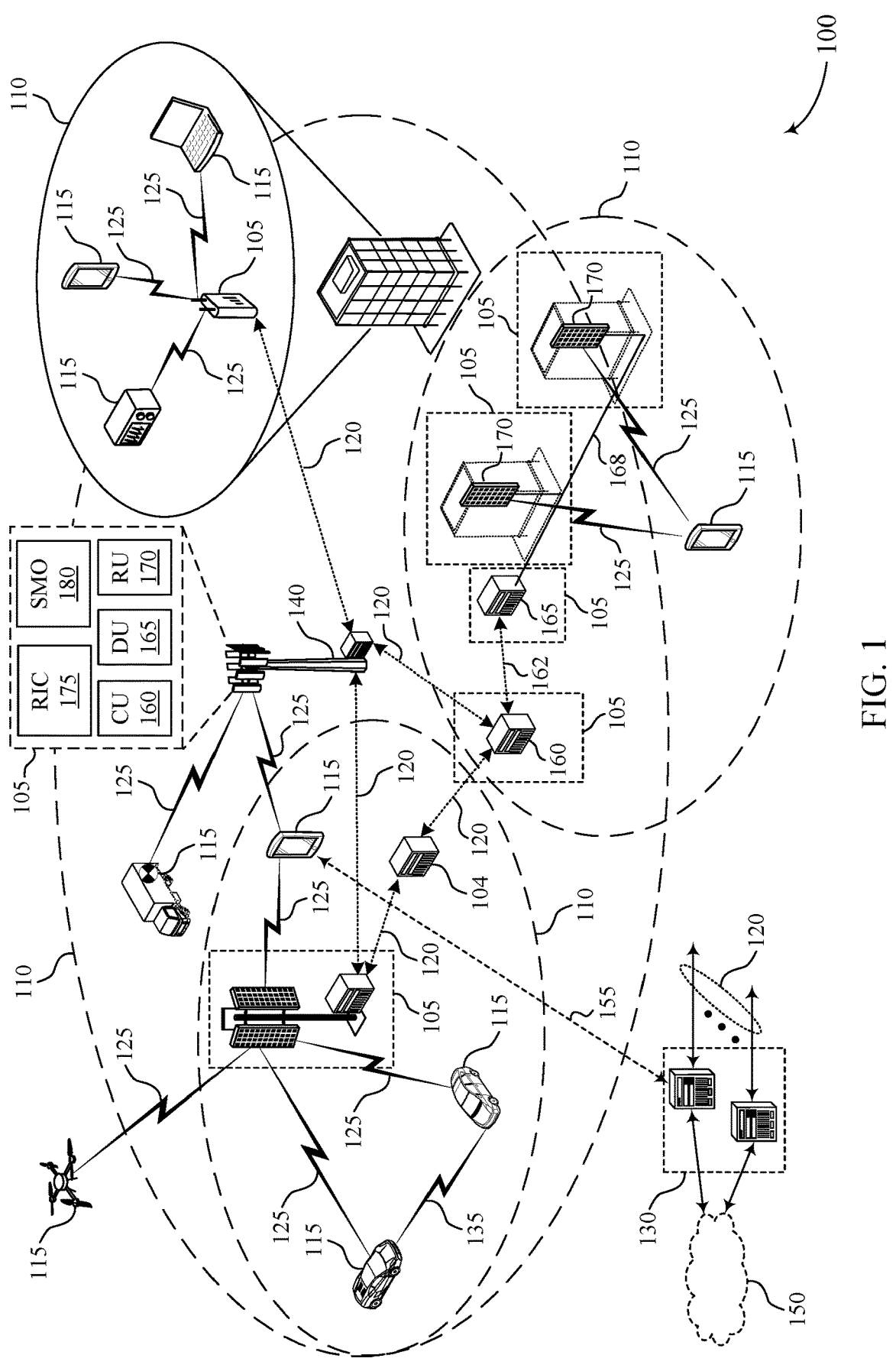

In some wireless communications systems, reference signals such as channel state information reference signals (CSI-RSs) may be used to support effective channel and interference measurements between devices. For example, a user equipment (UE) may receive CSI-RSs from the network, and may perform time and frequency tracking measurements, beam measurements, or other measurements using the received CSI-RS. An example of an application of CSI-RS signaling is a tracking reference signal (TRS). TRS supports frequency and time tracking for channel delay spread and doppler spread estimation for communications at the UE, and may be periodically signaled to the UE. In addition, the network may signal TRS to idle or inactive UEs, which may increase power savings for time and frequency tracking. In some cases, the TRS power level may change dynamically. Connected UEs may be informed of dynamic power changes of the TRS using an established connection with the network and may adapt to changes of TRS power. However, because idle or inactive UEs may not maintain an active connection with the network, they may not receive notification of dynamic changes in TRS power level, which may impact the ability to perform effective time and frequency tracking.

Techniques described herein may enable idle or inactive UEs to be made aware of dynamic changes in TRS parameters, such as dynamic power level changes for the TRS. In some examples, a network entity (e.g., network device, base station) may dynamically indicate TRS parameters to UEs that are operating in an idle mode or an inactive mode, or may indicate to the UE that the TRS parameters are dynamic or are otherwise going to be changing dynamically. For example, the network entity may dynamically indicate TRS parameters using a dynamic paging indicator (e.g., paging early indication (PEI)), a paging downlink control information (DCI), or both. In some examples, the network may extend an existing PEI or paging DCI to include additional information about changing TRS parameters and TRS resource set(s) using a bitmap or a list. In some other examples, the network entity may notify the UE of future changes of TRS parameters, for example, using an indication that notifies the UE that one or more TRS parameters are configured to change dynamically. In such cases, the network entity may transmit a bit of information indicating whether the parameter is dynamic for each TRS parameter. The network entity may configure a validity duration for each parameter, a range of change for each parameter of each resource set, or both.

Aspects of the disclosure are initially described in the context of wireless communications systems. Aspects of the disclosure are further illustrated by and described with reference to wireless communications systems and a process flow. Aspects of the disclosure are further illustrated by and described with reference to apparatus diagrams, system diagrams, and flowcharts that relate to dynamic indication of TRS.

FIG. 1 illustrates an example of a wireless communications system 100 that supports dynamic indication of TRS in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support dynamic indication of TRS as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, or a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, wireless communications system 100 may utilize multiple types of reference signals. Examples of types of reference signals that may be used in downlink include phase tracking-RS (PT-RS), positioning-RS (PRS), and CSI-RS. Demodulation-RS (DM-RS) may be used in uplink, downlink, or both. CSI-RS may support channel and interference measurement for CSI feedback, measurements for beam management, receiving beam sweeping, frequency and time tracking, and mobility measurement for resource radio management (RRM). One example application of CSI-RS is TRS.

In some implementations, TRS may be an application of CSI-RS that may be implemented without feedback from the UE 115. For example, the network entity 105 may or may refrain from requesting feedback from the UE 115 for TRS. TRS may be utilized for frequency and time tracking, as well as channel delay spread and doppler spread estimation. In some examples, a CRI-RS resource may be configured with higher layer parameter TRS information (e.g., trs-Info). In some examples, TRS may be signaled to the UE 115 repeatedly or in a burst over a period of time. For example, a TRS burst may occupy one or two slots of time. In some examples, a TRS frequency span may be wide, which may provide improved delay spread estimation opportunity for the UE 115. For example, a TRS frequency span may occupy a full BWP. If the BWP exceeds a threshold (e.g., 52 RBs), the TRS may be configured to cover the full BWP that exceeds the threshold, or be configured to span up to the threshold.

The TRS may be configured for UEs 115 that are operating in idle or inactive modes for tracking loop updates. Additionally, or alternatively, the TRS may be configured for at least some of the UE 115 in a connected mode, and there may be no dedicated idle or inactive TRS and thus no excess network resource or power consumption. In some examples, increased opportunities for tracking loops to be updated based on both synchronization system block (SSB) and TRS may increase power savings. For example, the UE 115 may have a longer deep sleep time (e.g., TRS is configured with a periodicity of 20 ms, where on average the joint periodicity of SSB and TRS is 10 ms). The availability of TRS may configured for idle or inactive UEs 115 in dynamic paging indicator (e.g., PEI) or paging PDCCH.

In some examples, TRS power level may change dynamically in time. UEs 115 in a connected state may be informed of TRS power level changes due to the established and ongoing connection with the network entity 105. However, idle or inactive UEs 115 may be unaware of changing TRS power levels since these UEs may lack an active connection with the network. But in some cases, these idle or inactive UEs 115 may use TRS power level information for time-frequency tracking purposes, and may benefit from dynamic indication of TRS power level. Techniques described herein relate to enhancements for the adaptation of transmission power and processing (or reception processing) of signals and channels including the dynamic adjustment of transmission power. For example, the dynamic adjustment of transmission power may be applied for signals and channels including the dynamic downlink power control for specific channels or reference signals (e.g., CSI-RS) or the adjustment of power spectral density (PSD) assigned to physical resource blocks (PRBs) or PDSCH. In addition, UEs 115 may provide feedback or assistance information for adjustment of transmission power. In some other examples, the transmission power may be affected by geographical area or user density considerations.

The wireless communications system 100 may support dynamic indication of TRS for UEs operating in an idle state, and inactive state, or a connected state. For example, the network entity 105 may dynamically indicate TRS parameters to UEs 115 in idle mode or inactive mode, or may indicate to the UE 115 that the TRS parameters are dynamic or are otherwise going to dynamically change at some time in the future. In some cases, the network entity 105 may dynamically indicate TRS parameters using a dynamic paging indicator (e.g., PEI), a DCI, or both. In such cases, the network entity 105 may extend an existing PEI or paging DCI to include additional information about changing TRS parameters and TRS resource set(s) using a bitmap or a list. In some other examples, the network entity 105 may notify the UE 115 that one or more TRS parameters are configured to be dynamic TRS parameters or are parameters that may change the future. In such cases, the network entity 105 may transmit a bit of information for each TRS parameter to indicate possible change to the UEs 115 operating in idle mode or inactive mode.

FIG. 2 illustrates an example of a wireless communications system 200 that supports dynamic indication of TRS in accordance with one or more aspects of the present disclosure. For example, the wireless communications system 200 may support communications between a UE 115-a and a network entity 105-a. The UE 115-a may be an example of the UE 115 as described with reference to FIG. 1, and the network entity 105-a may be an example of the network entity 105 as described with reference to FIG. 1.

The UE 115-a and the network entity 105-a may communicate via a wireless link 205 and a wireless link 210, which may be examples of uplinks, downlinks, or other wireless communication links. In some examples, the UE 115-a may receive a TRS 220 and a dynamic indication 215 from the network entity 105-a. The UE 115-a may perform channel measurements using the TRS 220, and may transmit a channel measurement report (CMR) 225 to the network entity 105-a. The UE 115-a may determine the CMR 225 based on the TRS 220, the dynamic indication 215, or both.

In some examples, various aspects of the TRS 220 may be configured by the network entity 105-a. The TRS 220 may configured with a resource set and parameters. The TRS 220 resource set may include a threshold number of resource sets (e.g., may be configured up to 64 TRS resource sets). The TRS resource set may have two consecutive slots, and a TRS resource may be a CSI-RS in a symbol. Parameters of the TRS 220 may have values and may be common for the resource set. Parameters may include QCL information (e.g., where the QCL values may be indicated as an SSB index in range of 0 to 63, QCL type is 'typeC' with an SSB and, when applicable, 'typeD' with the same SSB), periodicity information via the parameter periodicityAndOffset (e.g., periodicity for the TRS may be a value of 10, 20, 40, or 80 ms, where the offset determines the location of the first slot of TRS resource set), a first OFDM symbol indicated by the parameterfirstOFDMSymbolInTimeDomain (e.g., value 0 to 9, indicates first symbol in a slot, a second symbol in the same slot can be derived implicitly with symbol index as firstOFDMSymbolInTimeDomain+4), frequency allocation information given by the parameterfrequencyDomainAllocation for a first row (Applicable values from {0, 1, 2, 3} to indicate the offset of the first resource element in a RB), a starting RB indicated by the parameter startingRB (e.g., given by values 0 to 274), a total number of RBs given by the parameter nrofRBs (e.g., given by values 24 to 276), power control values indicated by the parameter powerControlOffsetSS (e.g., including values of −3, 0, 3, or 6 dB), scrambling identifier information indicated by the parameter scramblingID (e.g., given by values 0 to 1023, where a single configured scrambling ID applies to all the TRS resources in the set, or each TRS resource is provided with a scrambling ID), and the number of resources for a TRS resource set (e.g., indicated by values 2, 4).

In some examples, one or more TRS 220 occasions may be configured for the UE 115-a. For example, in some cases, the configuration of the frequency location for the TRS is unrestricted by initial BWP, even if the UE 115-a does not expect to receive the TRS outside of the initial downlink BWP. The subcarrier spacing of the configured TRS resource may be the same as the subcarrier spacing of a control resource set. TRS information may be provided in the reference signal configuration, or may be provided in a different message or configuration.

In some implementations, the TRS 220 power level may change dynamically, or may vary in time. The dynamic indication 215 may dynamically indicate the power level of the TRS to the UE 115-a. For example, the dynamic indication 215 may include a quantity of bits to indicate a TRS resource set group (e.g., 6 bits to indicate which of the 64 TRS resources). The dynamic indication 215 may further include a quantity of bits to indicate power level (e.g., 2 bits to indicate which of 4 power states, indicating 8 bits total for the dynamic indication 215). The dynamic indication 215 may include an additional 2 bits to indicate extended dynamic paging indicator (e.g., PEI) to incorporate the TRS power level change.

In some other examples, the dynamic indication 215 may be a short message included in a paging PDCCH. For example, a reserved quantity of bits (e.g., 6 bits) of the paging PDCCH may be used for TRS availability indication. The reserved bits may be used to indicate which TRS resource set is adjusting its power level. For example, the bit field of 00 may be used to indicate the power level adjustment of the short message indicator which is reserved. In some examples, up to 2 bits of reserved 4 bits of short message may be used to indicate the power level of the TRS 220. In some other examples, the dynamic indication 215 may include a message (e.g., a message with a length of 64×8 bits) to indicate power level change of all resource sets (e.g., 64 resource sets).

In some implementations, the dynamic indication 215 may dynamically indicate a reduced bandwidth of the TRS 220 or a changing bandwidth of the TRS 220. The UE 115-*a* may reduce bandwidth of BWP monitoring, such as scanning a portion of a BWP (e.g., less than the 100 MHz BWP). In some examples, the network entity 105-*a* may reduce the bandwidth of the TRS 220, such as if there is no connected UE that is monitoring for the TRS 220. However, this might happen dynamically, and TRS signal generation may not depend on the length of signal itself. If the TRS is truncated, the network entity 105-*a* may refrain from indicating the dynamic change of the bandwidth of the TRS 220. In some examples, the UE 115-*a* may be operating in a narrow band that is not as narrow as other idle or inactive UEs. In such examples, the network entity 105-*a* may add another bit to the dynamic paging indicator to indicate to that UE 115-*a* the TRS 220 is narrow band, or use another 1 bit of reserved bits of short message in paging PDCCH to indicate to that UE 115-*a* the TRS 220 is narrow band.

To support dynamic indication of TRS for the UE 115-*a*, the network entity 105-*a* may dynamically indicate TRS parameters to the UE 115-*a*, or may indicate that the TRS parameters are going to dynamically change via the dynamic indication 215. In some cases, the network entity 105-*a* may dynamically indicate TRS parameters using a dynamic paging indicator (e.g., PEI), a DCI, or both. In such cases, the network entity 105-*a* may extend an existing PEI or paging DCI to include additional information about changing TRS parameters and TRS resource set(s). In some other examples, the network entity 105-*a* may notify the UE 115-*a* that one or more TRS parameters are configured to be dynamic TRS parameters, or are TRS parameters that will be dynamically changing. This dynamic indication 215 may allow the UE 115-*a* to more efficiently receive and monitor for TRS 220 to perform time and frequency tracking (e.g., during idle mode discontinuous reception (DRX), or while otherwise operating in an idle or inactive state).

Figure 3:
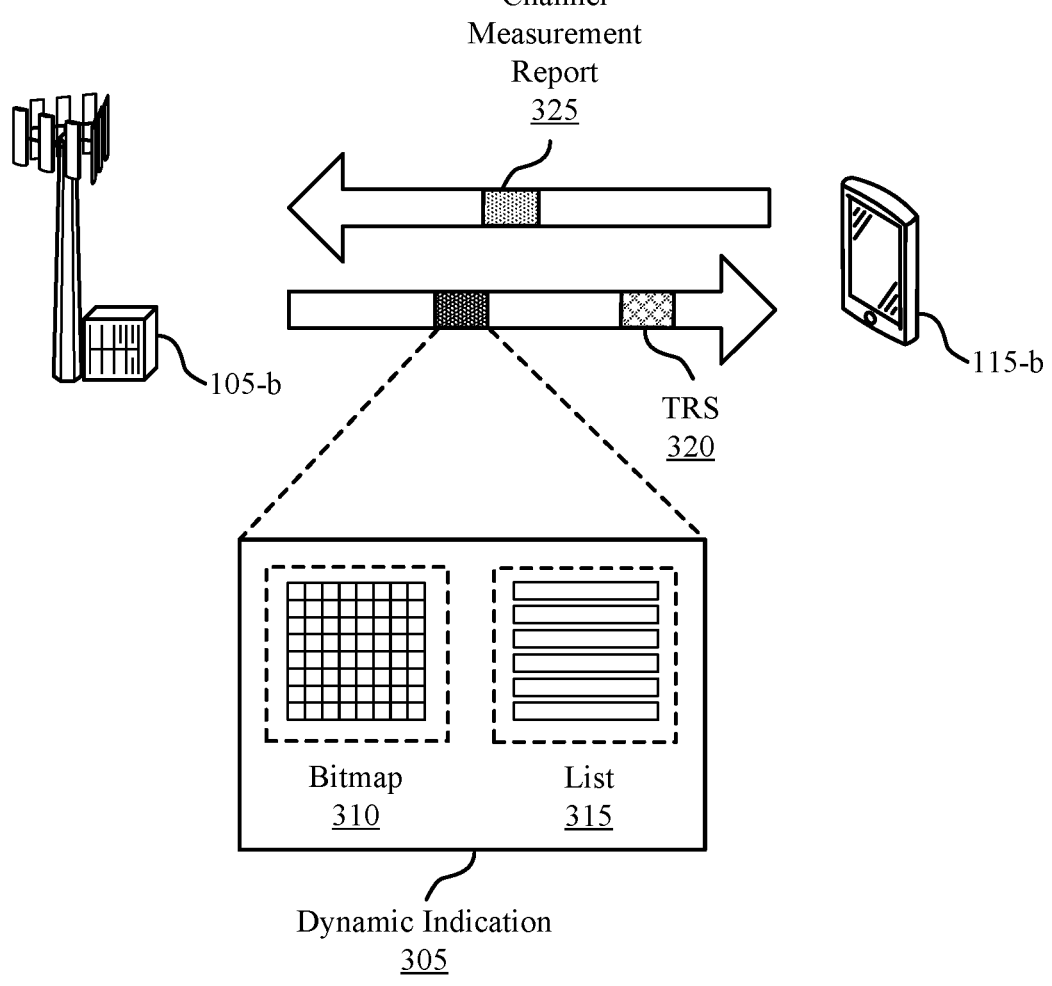

FIG. 3 illustrates an example of a wireless communications system 300 that supports dynamic indication of TRS in accordance with one or more aspects of the present disclosure. For example, the wireless communications system 300 may support communications between a UE 115-*b* and a network entity 105-*b*. The UE 115-*b* may be an example of the UE 115 as described with reference to FIG. 1, and the network entity 105-*b* may be an example of the network entity 105 as described with reference to FIG. 1.

The network entity 105-*b* may transmit a TRS 320 and a dynamic indication 305 including an indication such as a bitmap 310, a list 315, or both, to the UE 115-*b*. The UE 115-*b* may transmit a CMR 325 to the network entity 105-*b*, which may be based on (or responsive to) the dynamic indication 305.

The network entity 105-*b* may transmit the dynamic indication 305 to dynamically indicate TRS parameters to the UE 115-*b*, which in some examples may be operating in an idle or inactive state. The dynamic indication 305 may be included as an extension to a PEI, a paging DCI, or both. The network entity may include information via a number of bits to indicate a change in TRS parameters or which TRS resource set is dynamically changing as part of the dynamic indication 305.

In some examples, the network entity 105-*b* may include a number of TRS parameters to indicate changes in a TRS resource set. Such parameters may include a TRS Resource Set identifier (ID), TRS Resource Set Group ID, Beam ID, and TCI-State ID. The TRS Resource Set ID parameter may include 6 bits (e.g., MaxNrofNZP-CSI-RS-ResourceSets is 64). The TRS Resource Set Group ID parameter may include 3 bits (e.g., inBitID-r17 may be between 0 and 5). The Beam ID parameter may be one or more beams on which TRS 320 is configured, and the number of bits may be based on the beam ID design. The TCI-State ID parameter may include 7 bits (maxNrofTCI-States is 128).

Further information that may be included as part of the dynamic indication 305 may include power level (e.g., 2 bits), time domain allocation (e.g., 1 bit), and frequency domain allocation (e.g., 6 bits to indicate the number of RBs, one bit to indicate whether the TRS spans 52 RBs). In some other examples, the dynamic indication 305 may also be sent to UEs operating in a connected state via DCI (e.g., unicast or group-common DCI) or medium access control-control element (MAC-CE) (e.g., unicast or multicast).

In some examples, information may be transmitted via the dynamic indication 305, and may be formatted using the bitmap 310, the list 315, or both. In some examples, the TRS resource set group may indicate which resource sets are dynamically changing, and the power level of TRS may also be indicated as a TRS parameter that dynamically changes.

In some examples, the bitmap 310 may have a layer 1 (L1) availability indication. The number of bits in the bitmap 310 may be represented as N (e.g., 6 bits), where each bit may be associated with a group of TRS resource sets. The associated TRS resource sets for each bit may be based on an explicit configuration of a TRS resource set group. Such an explicit configuration may include each TRS resource configured with an ID (e.g., i) with a value from 0 to N−1 for the association with an indication bit in TRS availability indication field, and the $i^{th}$ bitmaps to all the TRS resource set(s) associated with ID (e.g., i). The start of the bitmap 310 may be the first bit of the reserved bits in paging PDCCH. In some examples, the explicit parameter may be used for the number of bits (e.g., N) or the number of bits may be implicitly determined by the TRS resource set configurations.

The bitmap 310 may be a two dimensional bitmap configured as a relatively large information element. A first dimension of the bitmap 310 may indicate the type of indication and a second dimension of the bitmap 310 may indicate the number of bits used for the information. For example, the bitmap 310 may be an information element including dimensions of 6×2 bits. Each two consecutive bits (e.g., resource set group 1,2) may indicate the power level of TRS associated to that TRS resource set group. In some implementations, the bitmap 310 may have a fixed size.

In some other examples, the network entity 105-*b* may indicate the dynamic TRS parameters using the list 315, which may be included as part of the dynamic indication 305. The list 315 may include a list of rows where each row of the list has a number of bits added to another number of bits to create a total number of bits (e.g., 3+2=5). The first set of bits (e.g., 3 bits) may indicate the TRS resource group ID, and the second set of bits (e.g., 2 bits) may indicate the power level of the respective TRS resource set group. The list 315 may have a variable size.

In some cases, the bit configuration of the bitmap and the list which may be included in the dynamic indication 305 may be summarized using Table 1, where two consecutive bits of the bitmap (e.g., [1][2]) indicate a TRS power level corresponding to a TRS group, and three consecutive bits of the list indicate a TRS resource group ID (e.g., [1][2][3]) correspond to the power level indicated by two consecutive bits (e.g., [1][2]):

TABLE 1

| Dynamic TRS Indication Information | |
| --- | --- |
| Type | Configuration |
| Bitmap | RSG1 RSG2 . . . RSG6 |
| (Fixed Size) | [1][2] [1][2] . . . [1][2] |
| List | RSG Indicator Power |
| (Variable Size) | [1][2][3] [1][2] |

Figure 4:
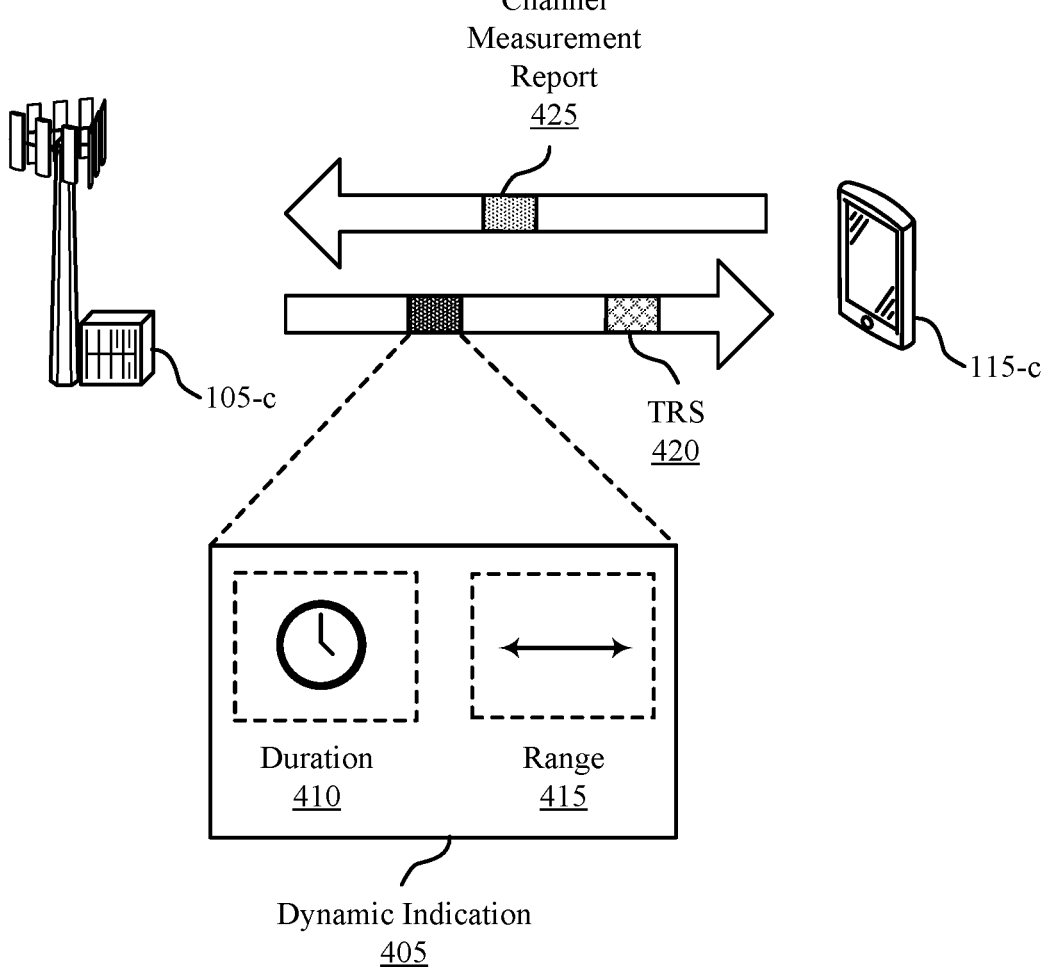

FIG. 4 illustrates an example of a wireless communications system 400 that supports dynamic indication of TRS in accordance with one or more aspects of the present disclosure. For example, the wireless communications system 400 may support communications between a UE 115-c and a network entity 105-c. The UE 115-c may be an example of the UE 115 as described with reference to FIG. 1, and the network entity 105-c may be an example of the network entity 105 as described with reference to FIG. 1.

The network entity 105-c may transmit a TRS 420 and a dynamic indication 405 including validity duration 410, a range 415, or both, to the UE 115-c. The UE 115-c may transmit a CMR 425 to the network entity 105-c, which may be based on (or responsive to) the dynamic indication 405. In some examples, indicating whether a parameter has changed every DRX cycle of a UE operating in an idle or inactive state may cause signaling overhead. The dynamic indication 405 may indicate that the TRS parameters are dynamic or will dynamically change in the future in order to reduce excess network signaling.

The network entity 105-c may consider a bit of information for each parameter of each resource set (e.g., group) to indicate to the UE 115-c whether that parameter will be dynamically changing as part of the dynamic indication 405. The network entity 105-c may also transmit the validity duration 410 for which the parameter is valid for each parameter of each resource set. The validity duration 410 may indicate how long that specific parameter of that resource set may be dynamically changing.

The network entity 105-c may also transmit the range 415 that indicates change for each parameter of each resource set. The range 415 may indicate the range for which a specific parameter of the resource set, which may include a range of TRS values that a TRS parameter may be dynamically changing between. The dynamic indication 405 may apply to the UE 115-c when in an idle state, an inactive state, or a connected state (e.g., in cases where the network entity 105-c transmits the dynamic indication 405 to the UE 115-c via a dedicated RRC message).

In some examples, the network entity 105-c may indicate (e.g., as system information block 17 (SIB17)) that the power level of one of the TRS resource sets may dynamically change by one bit information. In such examples, the UE 115-c would not use that TRS resource set for power delay profile (PDP) purposes. If the UE 115-c cannot track the range or TRS for automatic gain control, then the UE 115-c may not use that TRS resource set. If the algorithm that the UE 115-c uses for time and frequency tracking depends on observing multiple TRS bursts, then the UE 115-c may not use this resource set for time and frequency tracking or may use a different resource set for time and frequency tracking, because the dynamically changing TRS parameter may introduce variability in the measurements.

In some examples, if the network entity 105-c indicates validity duration 410, then the UE 115-c considers that power level of that TRS resource set may dynamically change for that validity duration 410. In some other examples, if the network entity indicates range 415, then the UE 115-c considers that power level of that TRS resource set to be dynamically changing in the range 415. The UE 115-c may then implement the information, such as by transmitting the CMR 425.

Figure 5:
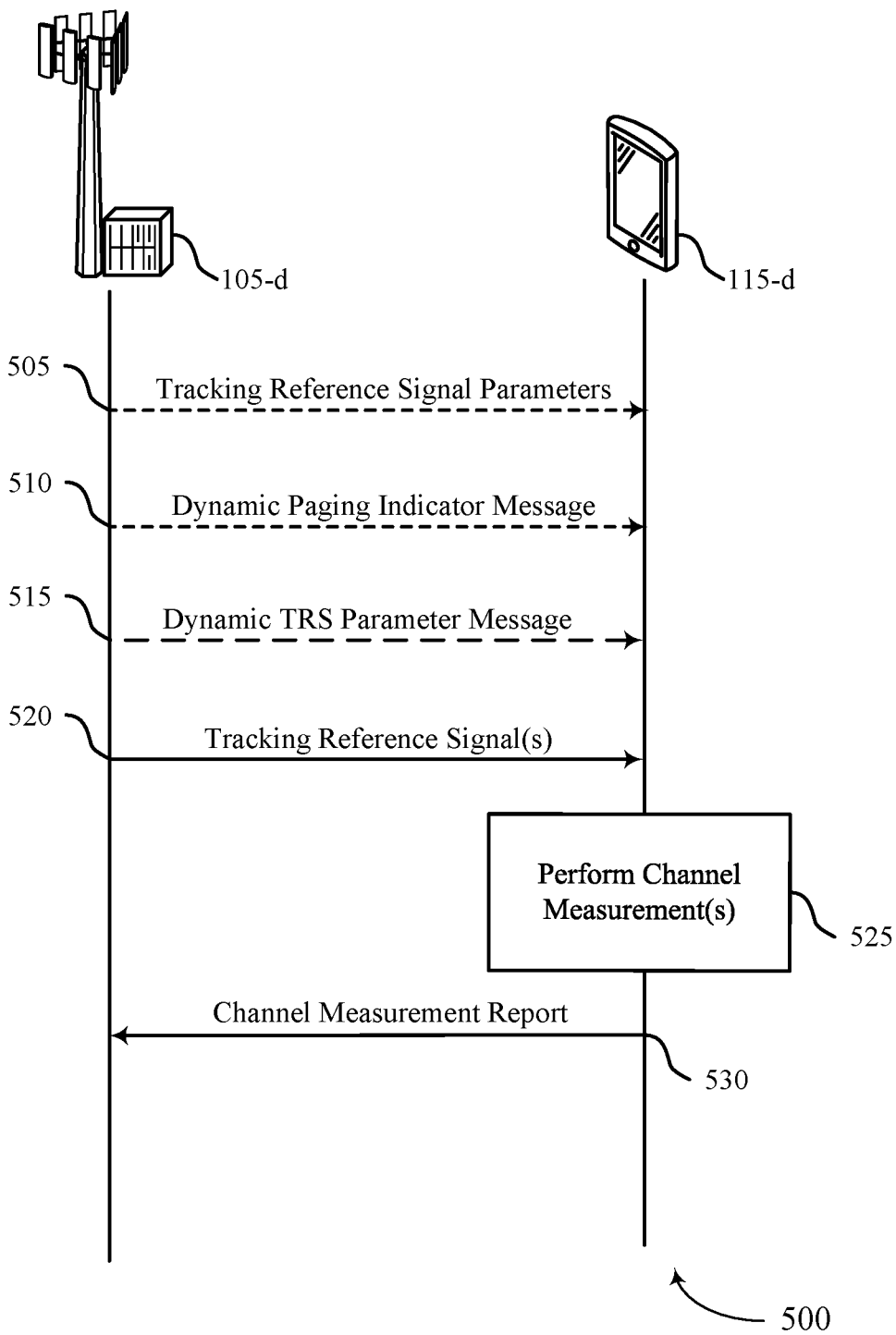
FIG. 5 illustrates an example of a process flow that supports dynamic indication of TRS in accordance with one or more aspects of the present disclosure.

FIG. 5 illustrates an example of a process flow diagram 500 that supports dynamic indication of TRS in accordance with one or more aspects of the present disclosure. For example, the process flow diagram 500 may support communications between a UE 115-d and a network entity 105-d. The UE 115-d may be an example of the UE 115 as described with reference to FIG. 1, and the network entity 105-d may be an example of the network entity 105 as described with reference to FIG. 1. Alternative examples of the following process flow may be implemented, where some steps are performed in a different order than described or are not performed at all. In some cases, steps may include additional features not mentioned below, or further steps may be added.

At 505, the network entity 105-d may transmit, and the UE 115-d may receive, one or more TRS parameters. The TRS parameters may be for the UE 115-d to perform channel measurements associated with one or more TRSs received by the UE 115-d operating in a first operation mode. In some examples, the first operation mode may include an idle operation mode or an inactive operation mode, as well as a connected mode. The UE 115-d and the network entity 105-a may perform one or more of the operations as described with reference to FIG. 5 in any of the first operation modes.

At 510, the UE 115-d may receive a dynamic paging indicator message that indicates a set of updated TRS parameters including one or more TRS parameters that are different from the one or more TRS parameters. The UE 115-d may receive, while in a first operation mode that is an idle mode or an inactive mode, the dynamic paging indicator message via a paging early indication message, a paging DCI message, or both. While in a connected mode, the UE 115-d may receive the dynamic paging indicator message via a unicast DCI message, a group-common DCI message, a multicast MAC-CE, a unicast MAC-CE, or any combination thereof.

The dynamic paging indicator message may include an indication of a TRS resource set that corresponds to the set of updated TRS parameters, the indication including a TRS resource set ID, a TRS resource set group ID, a beam ID, a transmission configuration indicator (TCI) state ID, or any combination thereof.

In some examples, the dynamic paging indicator may include an indication of the set of updated TRS parameters including an updated power level of the one or more TRSs, an updated time domain allocation of the one or more TRSs, an updated frequency domain allocation of the one or more TRSs, or any combination thereof, for the one or more TRS parameters.

The UE 115-d may receive, via a bitmap, an indication of a TRS resource set that corresponds to the set of updated TRS parameters including the at least one TRS parameter that is different from the one or more TRS parameters. A first bit of the bitmap may correspond to the at least one TRS parameter that is different from the one or more TRS parameters, and a second bit of the bitmap may indicate the TRS resource set that includes the at least one TRS parameter.

The dynamic paging indicator may include receiving, via a list, an indication of a TRS resource set that corresponds to the set of updated TRS parameters including the at least one TRS parameter that is different from the one or more TRS parameters. Each row of the list may include a first set of bits that indicate the TRS resource set that includes the at least one TRS parameter, and a second set of bits that indicates the at least one TRS parameter that is different from the one or more TRS parameters.

In some examples, the UE 115-d may receive the dynamic paging indicator message before a paging occasion of a DRX cycle of the UE 115-d.

At 515, the UE 115-d may receive a dynamic TRS parameter message. The dynamic TRS parameter message may be an indication that at least one TRS parameter of the one or more TRS parameters is configured as the dynamic TRS parameter. The UE 115-d may receive one or more bits that correspond to the at least one TRS parameters, where the one or more bits indicate whether the at least one TRS parameter is configured as the dynamic TRS parameter.

The dynamic TRS parameter message may include a validity parameter, a range parameter, or both. The validity parameter may be associated with the at least one TRS parameter, where the validity parameter indicates a duration of time that the at least one TRS parameter is configured as the dynamic TRS parameter. The range parameter may be associated with the at least one TRS parameter, where the range parameter indicates a range of values available for the dynamic TRS parameter. The dynamic TRS parameter may indicate a change in a power level of one or more the one or more TRSs.

The UE 115-d may receive the dynamic TRS parameter via an SIB or an RRC message.

At 520, the UE 115-d may receive one or more TRSs, and at 525, the UE 115-d may perform channel measurements in accordance with the set of updated TRS parameters. The UE 115-d may perform the channel measurements based on a set of updated TRS parameters including at least the dynamic TRS parameter. Performing the channel measurements may include performing one or more power delay profile measurements by excluding one or more measurements associated with the dynamic TRS parameter.

At 530, the UE 115-d may transmit a CMR in accordance with the set of updated TRS parameters.

Figure 6:
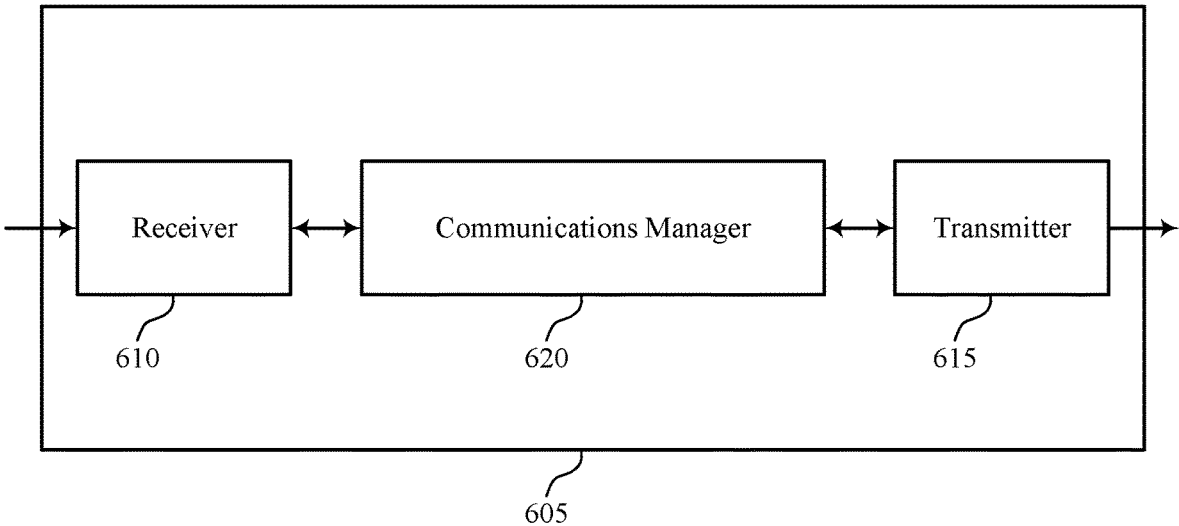
FIGS. 6 and 7 show block diagrams of devices that support dynamic indication of TRS in accordance with one or more aspects of the present disclosure.

FIG. 6 shows a block diagram 600 of a device 605 that supports dynamic indication of TRS in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic indication of TRS). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic indication of TRS). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of dynamic indication of TRS as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware, software (e.g., executed by a processor), or any combination thereof. The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving one or more TRS parameters configured for the UE to perform channel measurements associated with one or more TRSs received by the UE operating in a first operation mode. The communications manager 620 may be configured as or otherwise support a means for receiving a dynamic paging indicator message that indicates a set of updated TRS parameters including at least one TRS parameter that is different from the one or more TRS parameters. The communications manager 620 may be configured as or otherwise support a means for receiving the one or more TRSs. The communications manager 620 may be configured as or otherwise support a means for performing the channel measurements in accordance with the set of updated TRS parameters.

Additionally, or alternatively, the communications manager 620 may support wireless communication at a UE in accordance with examples as disclosed herein. For example, the communications manager 620 may be configured as or otherwise support a means for receiving one or more TRS parameters configured for the UE to perform channel measurements associated with one or more TRSs received by the UE operating in a first operation mode. The communications manager 620 may be configured as or otherwise support a means for receiving an indication that at least one TRS parameter of the one or more TRS parameters is configured as a dynamic TRS parameter. The communications manager 620 may be configured as or otherwise support a means for receiving the one or more TRSs and performing the channel measurements based on a set of updated TRS parameters including at least the dynamic TRS parameter.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for dynamic indication of TRS, which may include advantages such as reduced processing, reduced power consumption at the UE and the network entity, and more efficient utilization of communication resources.

Figure 7:
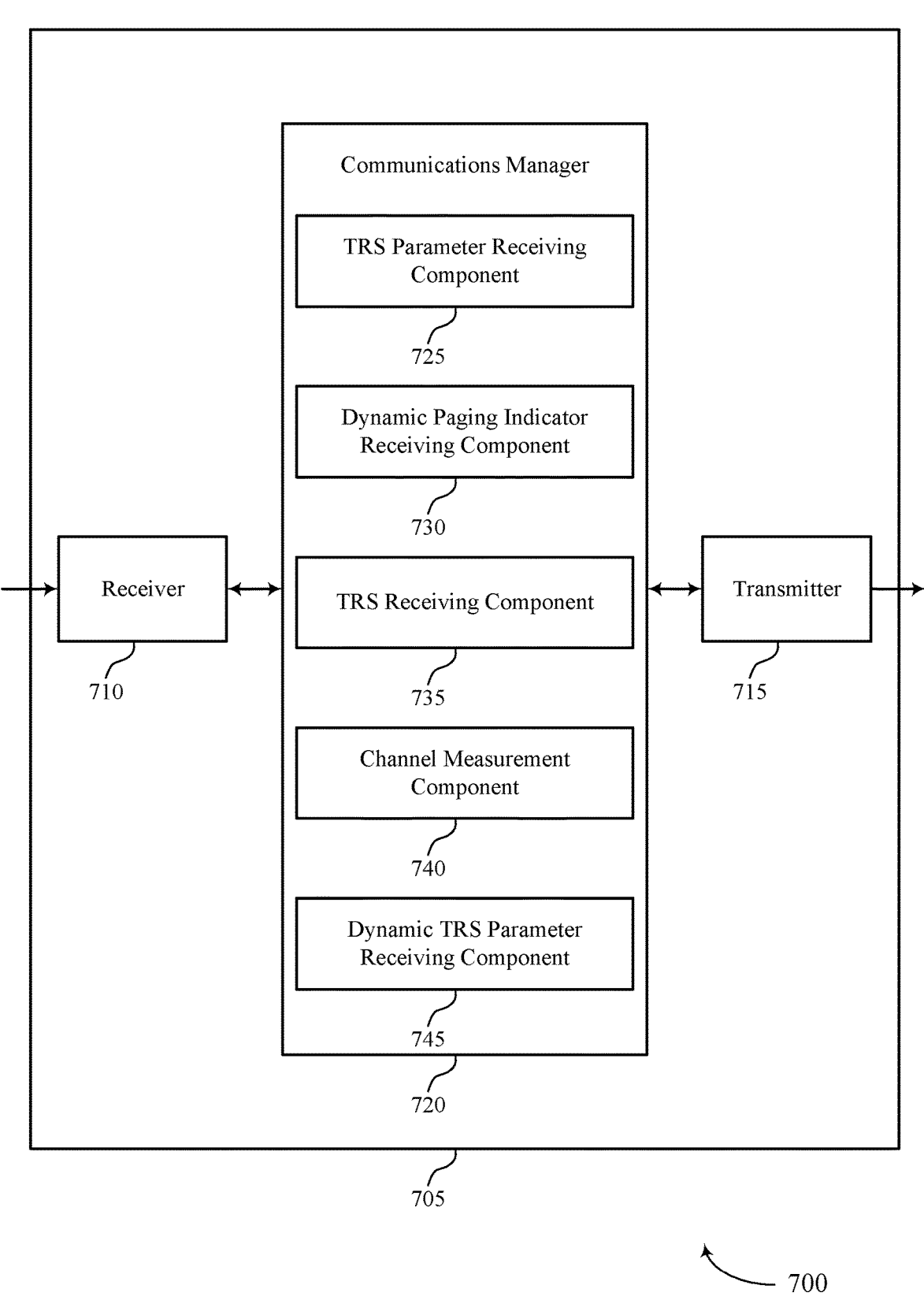

FIG. 7 shows a block diagram 700 of a device 705 that supports dynamic indication of TRS in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic indication of TRS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic indication of TRS). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of dynamic indication of TRS as described herein. For example, the communications manager 720 may include an TRS parameter receiving component 725, a dynamic paging indicator receiving component 730, an TRS receiving component 735, a channel measurement component 740, a dynamic TRS parameter receiving component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The TRS parameter receiving component 725 may be configured as or otherwise support a means for receiving one or more TRS parameters configured for the UE to perform channel measurements associated with one or more TRSs received by the UE operating in a first operation mode. The dynamic paging indicator receiving component 730 may be configured as or otherwise support a means for receiving a dynamic paging indicator message that indicates a set of updated TRS parameters including at least one TRS parameter that is different from the one or more TRS parameters. The TRS receiving component 735 may be configured as or otherwise support a means for receiving the one or more TRSs. The channel measurement component 740 may be configured as or otherwise support a means for performing the channel measurements in accordance with the set of updated TRS parameters.

Additionally, or alternatively, the communications manager 720 may support wireless communication at a UE in accordance with examples as disclosed herein. The TRS parameter receiving component 725 may be configured as or otherwise support a means for receiving one or more TRS parameters configured for the UE to perform channel measurements associated with one or more TRSs received by the UE operating in a first operation mode. The dynamic TRS parameter receiving component 745 may be configured as or otherwise support a means for receiving an indication that at least one TRS parameter of the one or more TRS parameters is configured as a dynamic TRS parameter. The TRS receiving component 735 may be configured as or otherwise support a means for receiving the one or more TRSs and performing the channel measurements based on a set of updated TRS parameters including at least the dynamic TRS parameter.

FIG. 8 shows a block diagram 800 of a communications manager 820 that supports dynamic indication of TRS in accordance with one or more aspects of the present disclosure. The communications manager 820 may be an example of aspects of a communications manager 620, a communications manager 720, or both, as described herein. The communications manager 820, or various components thereof, may be an example of means for performing various aspects of dynamic indication of TRS as described herein. For example, the communications manager 820 may include an TRS parameter receiving component 825, a dynamic paging indicator receiving component 830, an TRS receiving component 835, a channel measurement component 840, a dynamic TRS parameter receiving component 845, or any combination thereof. Each of these components may communicate, directly or indirectly, with one another (e.g., via one or more buses).

The communications manager 820 may support wireless communication at a UE in accordance with examples as disclosed herein. The TRS parameter receiving component 825 may be configured as or otherwise support a means for receiving one or more TRS parameters configured for the UE to perform channel measurements associated with one or more TRSs received by the UE operating in a first operation mode. The dynamic paging indicator receiving component 830 may be configured as or otherwise support a means for receiving a dynamic paging indicator message that indicates a set of updated TRS parameters including at least one TRS parameter that is different from the one or more TRS parameters. The TRS receiving component 835 may be configured as or otherwise support a means for receiving the one or more TRSs. The channel measurement component 840 may be configured as or otherwise support a means for performing the channel measurements in accordance with the set of updated TRS parameters.

In some examples, to support receiving the dynamic paging indicator message, the dynamic paging indicator receiving component 830 may be configured as or otherwise support a means for receiving an indication of a TRS resource set that corresponds to the set of updated TRS parameters, the indication including a TRS resource set identifier, a TRS resource set group identifier, a beam identifier, a TCI state identifier, or any combination thereof.

In some examples, to support receiving the dynamic paging indicator message, the dynamic paging indicator receiving component 830 may be configured as or otherwise support a means for receiving an indication of the set of updated TRS parameters, the set of updated TRS parameters including an updated power level of the one or more TRSs, an updated time domain allocation of the one or more TRSs, an updated frequency domain allocation of the one or more TRSs, or any combination thereof, for the at least one TRS parameter.

In some examples, to support receiving the dynamic paging indicator message, the dynamic paging indicator receiving component 830 may be configured as or otherwise support a means for receiving, via a bitmap, an indication of a TRS resource set that corresponds to the set of updated TRS parameters including the at least one TRS parameter that is different from the one or more TRS parameters.

In some examples, a first bit of the bitmap corresponds to the at least one TRS parameter that is different from the one or more TRS parameters, and a second bit of the bitmap indicates the TRS resource set that includes the at least one TRS parameter.

In some examples, to support receiving the dynamic paging indicator message, the dynamic paging indicator receiving component 830 may be configured as or otherwise support a means for receiving, via a list, an indication of a TRS resource set that corresponds to the set of updated TRS parameters including the at least one TRS parameter that is different from the one or more TRS parameters.

In some examples, each row of the list includes a first set of bits that indicate the TRS resource set that includes the at least one TRS parameter, and a second set of bits that indicates the at least one TRS parameter that is different from the one or more TRS parameters.

In some examples, the dynamic paging indicator receiving component 830 may be configured as or otherwise support a means for receiving the dynamic paging indicator message before a paging occasion of a DRX cycle of the UE.

In some examples, the first operation mode includes an idle operation mode or an inactive operation mode, and the dynamic paging indicator receiving component 830 may be configured as or otherwise support a means for receiving the dynamic paging indicator message via a paging early indication message, a paging DCI message, or both.

In some examples, the first operation mode includes a connected mode, and the dynamic paging indicator receiving component 830 may be configured as or otherwise support a means for receiving the dynamic paging indicator message via a unicast DCI message, a group-common DCI message, a multicast MAC-CE, a unicast MAC-CE, or any combination thereof.

Additionally, or alternatively, the communications manager 820 may support wireless communication at a UE in accordance with examples as disclosed herein. In some examples, the TRS parameter receiving component 825 may be configured as or otherwise support a means for receiving one or more TRS parameters configured for the UE to perform channel measurements associated with one or more TRSs received by the UE operating in a first operation mode. The dynamic TRS parameter receiving component 845 may be configured as or otherwise support a means for receiving an indication that at least one TRS parameter of the one or more TRS parameters is configured as a dynamic TRS parameter. In some examples, the TRS receiving component 835 may be configured as or otherwise support a means for receiving the one or more TRSs and performing the channel measurements based on a set of updated TRS parameters including at least the dynamic TRS parameter.

In some examples, the dynamic TRS parameter receiving component 845 may be configured as or otherwise support a means for receiving one or more bits that correspond to the at least one TRS parameter, where the one or more bits indicate whether the at least one TRS parameter is configured as the dynamic TRS parameter.

In some examples, to support receiving the indication, the dynamic TRS parameter receiving component 845 may be configured as or otherwise support a means for receiving a validity parameter associated with the at least one TRS parameter, where the validity parameter indicates a duration of time that the at least one TRS parameter is configured as the dynamic TRS parameter.

In some examples, to support receiving the indication, the dynamic TRS parameter receiving component 845 may be configured as or otherwise support a means for receiving a range parameter associated with the at least one TRS parameter, where the range parameter indicates a range of values available for the dynamic TRS parameter.

In some examples, to support receiving the one or more TRSs and performing the channel measurements, the channel measurement component 840 may be configured as or otherwise support a means for performing one or more power delay profile measurements by excluding one or more measurements associated with the dynamic TRS parameter.

In some examples, the dynamic TRS parameter indicates a change in a power level of one or more the one or more TRSs.

In some examples, the dynamic TRS parameter receiving component 845 may be configured as or otherwise support a means for receiving the indication of the dynamic TRS parameter via a system information block.

In some examples, the dynamic TRS parameter receiving component 845 may be configured as or otherwise support a means for receiving the indication of the dynamic TRS parameter via a RRC message.

Figure 9:
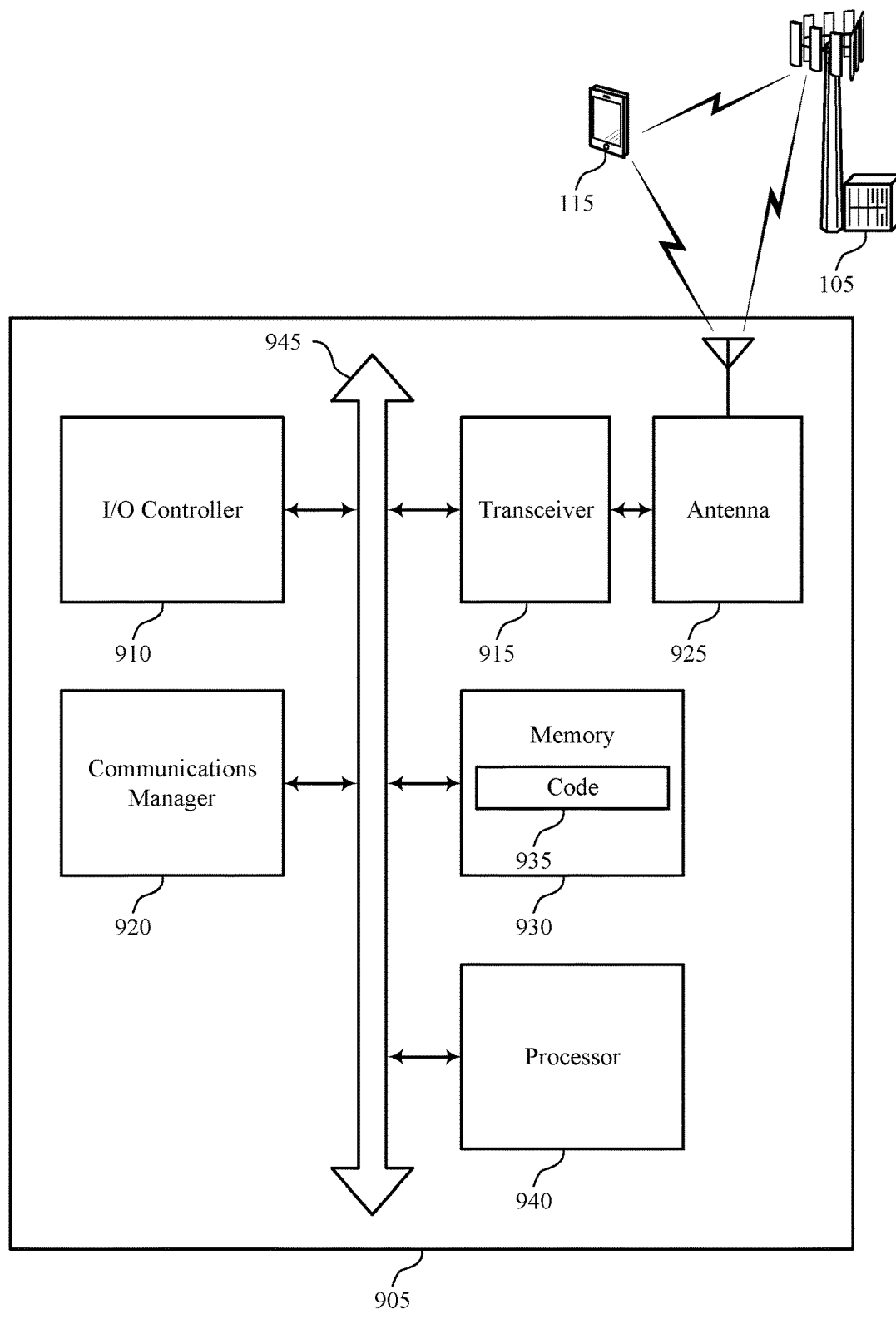
FIG. 9 shows a diagram of a system including a device that supports dynamic indication of TRS in accordance with one or more aspects of the present disclosure.

FIG. 9 shows a diagram of a system 900 including a device 905 that supports dynamic indication of TRS in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic indication of TRS). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving one or more TRS parameters configured for the UE to perform channel measurements associated with one or more TRSs received by the UE operating in a first operation mode. The communications manager 920 may be configured as or otherwise support a means for receiving a dynamic paging indicator message that indicates a set of updated TRS parameters including at least one TRS parameter that is different from the one or more TRS parameters. The communications manager 920 may be configured as or otherwise support a means for receiving the one or more TRSs. The communications manager 920 may be configured as or otherwise support a means for performing the channel measurements in accordance with the set of updated TRS parameters.

Additionally, or alternatively, the communications manager 920 may support wireless communication at a UE in accordance with examples as disclosed herein. For example, the communications manager 920 may be configured as or otherwise support a means for receiving one or more TRS parameters configured for the UE to perform channel measurements associated with one or more TRSs received by the UE operating in a first operation mode. The communications manager 920 may be configured as or otherwise support a means for receiving an indication that at least one TRS parameter of the one or more TRS parameters is configured as a dynamic TRS parameter. The communications manager 920 may be configured as or otherwise support a means for receiving the one or more TRSs and performing the channel measurements based on a set of updated TRS parameters including at least the dynamic TRS parameter.

By including or configuring the communications manager 920 in accordance with examples as described herein, the device 905 may support techniques for dynamic indication of TRS, which may include advantages such as improved communication reliability, reduced latency, improved user experience related to reduced processing, reduced power consumption at the UE and the network entity, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of dynamic indication of TRS as described herein, or the processor 940 and the memory 930 may be otherwise configured to perform or support such operations.

Figure 10:
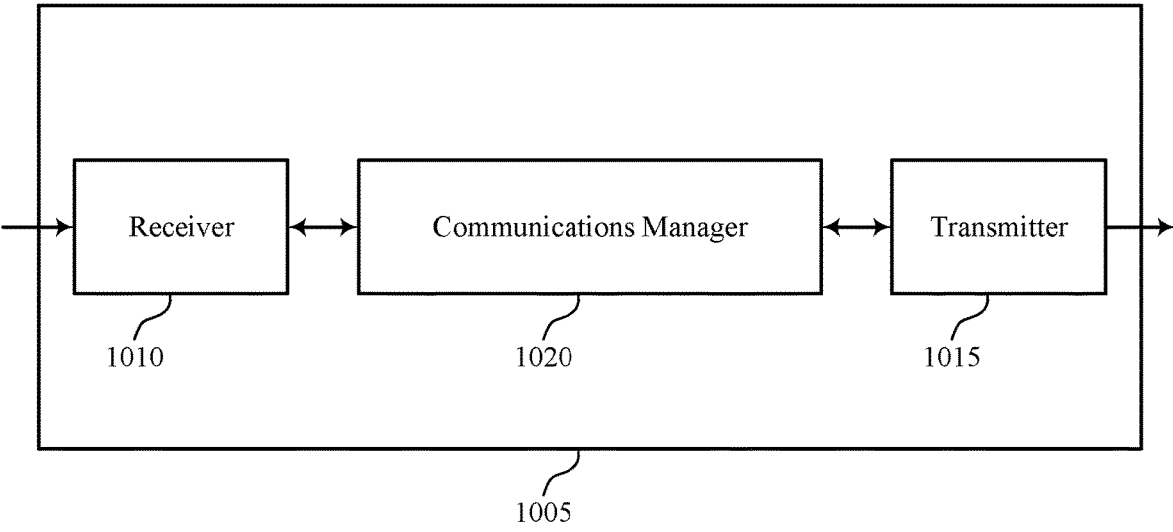
FIGS. 10 and 11 show block diagrams of devices that support dynamic indication of TRS in accordance with one or more aspects of the present disclosure.

FIG. 10 shows a block diagram 1000 of a device 1005 that supports dynamic indication of TRS in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of dynamic indication of TRS as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware, software (e.g., executed by a processor), or any combination thereof. The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting one or more TRS parameters configured for a UE to perform channel measurements associated with one or more TRSs transmitted to the UE. The communications manager 1020 may be configured as or otherwise support a means for transmitting a dynamic paging indicator message that indicates a set of updated TRS parameters including at least one TRS parameter that is different from the one or more TRS parameters. The communications manager 1020 may be configured as or otherwise support a means for transmitting the one or more TRSs. The communications manager 1020 may be configured as or otherwise support a means for receiving a CMR in accordance with the set of updated TRS parameters.

Additionally, or alternatively, the communications manager 1020 may support wireless communication at a network entity in accordance with examples as disclosed herein. For example, the communications manager 1020 may be configured as or otherwise support a means for transmitting one or more TRS parameters configured for a UE to perform channel measurements associated with one or more TRSs transmitted to UE. The communications manager 1020 may be configured as or otherwise support a means for transmitting an indication that at least one TRS parameter of the one or more TRS parameters is configured as a dynamic TRS parameter. The communications manager 1020 may be configured as or otherwise support a means for transmitting the one or more TRSs. The communications manager 1020 may be configured as or otherwise support a means for receiving a CMR based on a set of updated TRS parameters including at least the dynamic TRS parameter.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for dynamic indication of TRS, which may include advantages such as reduced processing, reduced power consumption at the UE and the network entity, and more efficient utilization of communication resources.

Figure 11:
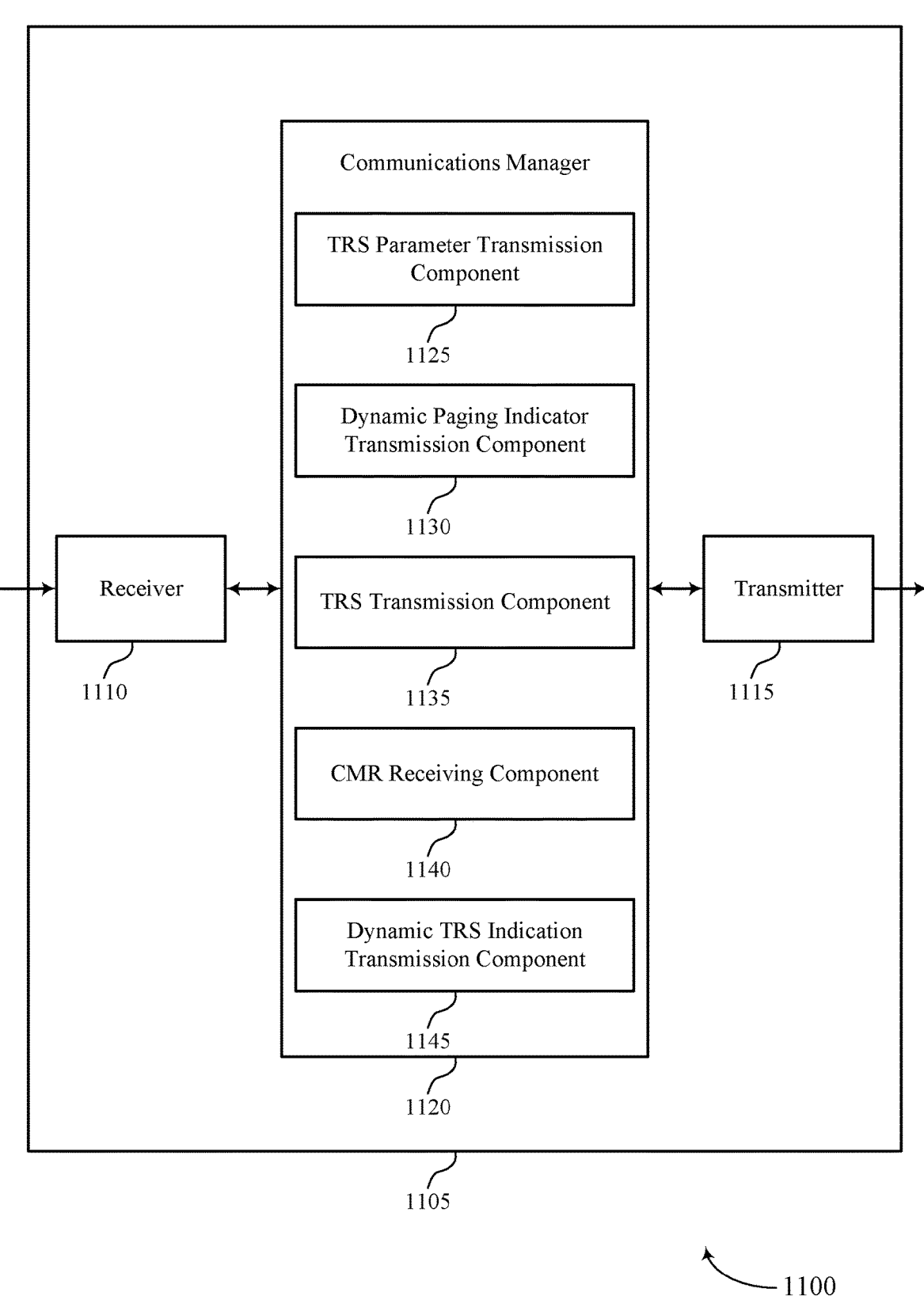

FIG. 11 shows a block diagram 1100 of a device 1105 that supports dynamic indication of TRS in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of dynamic indication of TRS as described herein. For example, the communications manager 1120 may include an TRS parameter transmission component 1125, a dynamic paging indicator transmission component 1130, an TRS transmission component 1135, a CMR receiving component 1140, a dynamic TRS indication transmission component 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The TRS parameter transmission component 1125 may be configured as or otherwise support a means for transmitting one or more TRS parameters configured for a UE to perform channel measurements associated with one or more TRSs transmitted to the UE. The dynamic paging indicator transmission component 1130 may be configured as or otherwise support a means for transmitting a dynamic paging indicator message that indicates a set of updated TRS parameters including at least one TRS parameter that is different from the one or more TRS parameters. The TRS transmission component 1135 may be configured as or otherwise support a means for transmitting the one or more TRSs. The CMR receiving component 1140 may be configured as or otherwise support a means for receiving a CMR in accordance with the set of updated TRS parameters.

Additionally, or alternatively, the communications manager 1120 may support wireless communication at a network entity in accordance with examples as disclosed herein. The TRS parameter transmission component 1125 may be configured as or otherwise support a means for transmitting one or more TRS parameters configured for a UE to perform channel measurements associated with one or more TRSs transmitted to UE. The dynamic TRS indication transmission component 1145 may be configured as or otherwise support a means for transmitting an indication that at least one TRS parameter of the one or more TRS parameters is configured as a dynamic TRS parameter. The TRS transmission component 1135 may be configured as or otherwise support a means for transmitting the one or more TRSs. The CMR receiving component 1140 may be configured as or otherwise support a means for receiving a CMR based on a set of updated TRS parameters including at least the dynamic TRS parameter.

Figure 12:
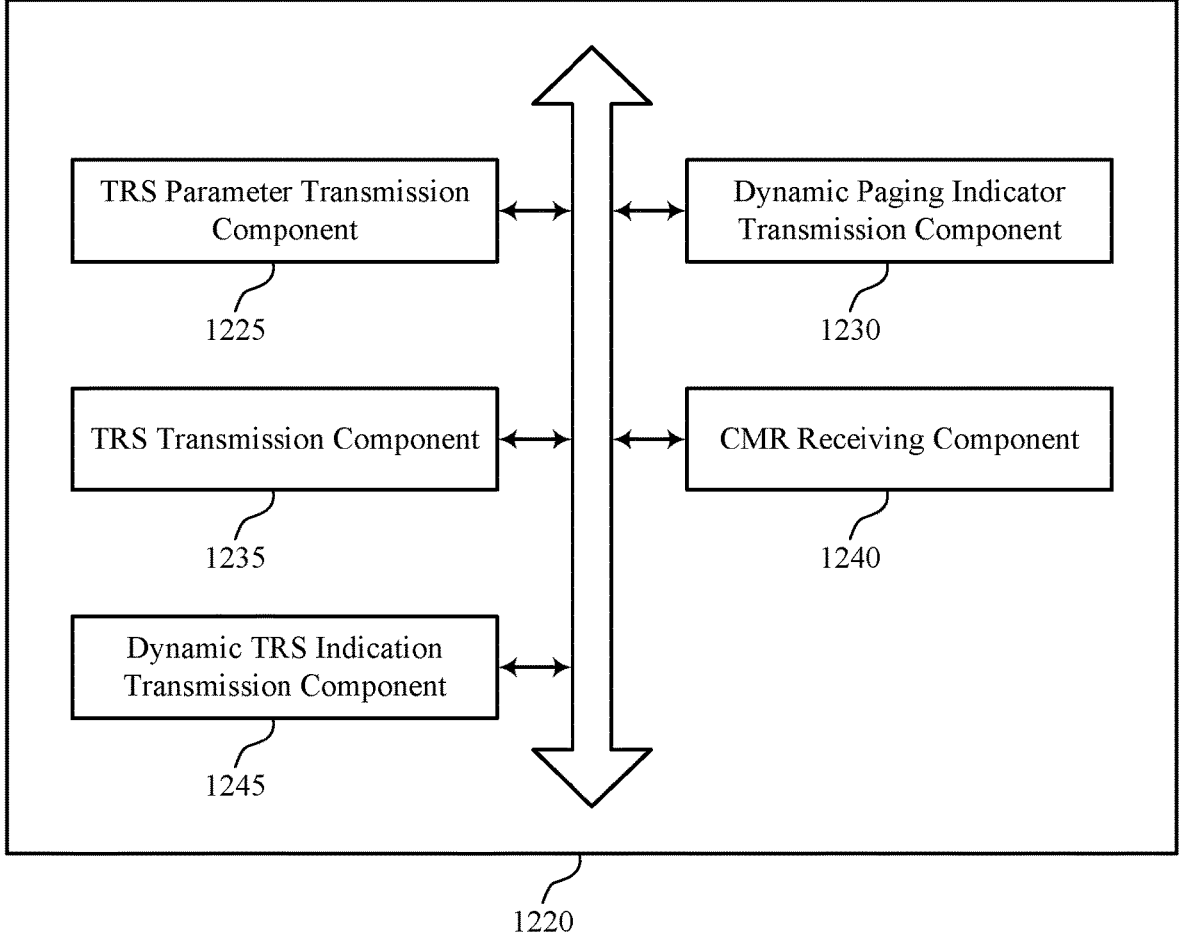
FIG. 12 shows a block diagram of a communications manager that supports dynamic indication of TRS in accordance with one or more aspects of the present disclosure.

FIG. 12 shows a block diagram 1200 of a communications manager 1220 that supports dynamic indication of TRS in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of dynamic indication of TRS as described herein. For example, the communications manager 1220 may include an TRS parameter transmission component 1225, a dynamic paging indicator transmission component 1230, an TRS transmission component 1235, an CMR receiving component 1240, a dynamic TRS indication transmission component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The TRS parameter transmission component 1225 may be configured as or otherwise support a means for transmitting one or more TRS parameters configured for a UE to perform channel measurements associated with one or more TRSs transmitted to the UE. The dynamic paging indicator transmission component 1230 may be configured as or otherwise support a means for transmitting a dynamic paging indicator message that indicates a set of updated TRS parameters including at least one TRS parameter that is different from the one or more TRS parameters. The TRS transmission component 1235 may be configured as or otherwise support a means for transmitting the one or more TRSs. The CMR receiving component 1240 may be configured as or otherwise support a means for receiving a CMR in accordance with the set of updated TRS parameters.

In some examples, to support transmitting the dynamic paging indicator message, the dynamic paging indicator transmission component 1230 may be configured as or otherwise support a means for transmitting an indication of a TRS resource set that corresponds to the set of updated TRS parameters, the indication including a TRS resource set identifier, a TRS resource set group identifier, a beam identifier, a TCI state identifier, or any combination thereof.

In some examples, to support transmitting the dynamic paging indicator message, the dynamic paging indicator transmission component 1230 may be configured as or otherwise support a means for transmitting an indication of the set of updated TRS parameters, the set of updated TRS parameters including an updated power level of the one or more TRSs, an updated time domain allocation of the one or more TRSs, an updated frequency domain allocation of the one or more TRSs, or any combination thereof, for the at least one TRS parameter.

In some examples, to support transmitting the dynamic paging indicator message, the dynamic paging indicator transmission component 1230 may be configured as or otherwise support a means for transmitting, via a bitmap, an indication of a TRS resource set that corresponds to the set of updated TRS parameters including the at least one TRS parameter that is different from the one or more TRS parameters.

In some examples, a first bit of the bitmap corresponds to the at least one TRS parameter that is different from the one or more TRS parameters, and a second bit of the bitmap indicates the TRS resource set that includes the at least one TRS parameter.

In some examples, to support transmitting the dynamic paging indicator message, the dynamic paging indicator transmission component 1230 may be configured as or otherwise support a means for transmitting, via a list, an indication of a TRS resource set that corresponds to the set of updated TRS parameters including the at least one TRS parameter that is different from the one or more TRS parameters.

In some examples, each row of the list includes a first set of bits that indicate the TRS resource set that includes the at least one TRS parameter, and a second set of bits that indicates the at least one TRS parameter that is different from the one or more TRS parameters.

In some examples, the dynamic paging indicator transmission component 1230 may be configured as or otherwise support a means for transmitting the dynamic paging indicator message via a paging early indication message, a paging DCI message, a unicast DCI message, a group-common DCI message, a multicast MAC-CE, a unicast MAC-CE, or any combination thereof.

Additionally, or alternatively, the communications manager 1220 may support wireless communication at a network entity in accordance with examples as disclosed herein. In some examples, the TRS parameter transmission component 1225 may be configured as or otherwise support a means for transmitting one or more TRS parameters configured for a UE to perform channel measurements associated with one or more TRSs transmitted to UE. The dynamic TRS indication transmission component 1245 may be configured as or otherwise support a means for transmitting an indication that at least one TRS parameter of the one or more TRS parameters is configured as the dynamic TRS parameter. In some examples, the TRS transmission component 1235 may be configured as or otherwise support a means for transmitting the one or more TRSs. In some examples, the CMR receiving component 1240 may be configured as or otherwise support a means for receiving a CMR based on a set of updated TRS parameters including at least the dynamic TRS parameter.

In some examples, the dynamic TRS indication transmission component 1245 may be configured as or otherwise support a means for transmitting one or more bits that correspond to the at least one TRS parameter, where the one or more bits indicate whether the at least one TRS parameter is configured as the dynamic TRS parameter.

In some examples, to support transmitting the indication, the dynamic TRS indication transmission component 1245 may be configured as or otherwise support a means for transmitting a validity parameter associated with the at least one TRS parameter, where the validity parameter indicates a duration of time that the at least one TRS parameter is configured as the dynamic TRS parameter.

In some examples, to support transmitting the indication, the dynamic TRS indication transmission component 1245 may be configured as or otherwise support a means for transmitting a range parameter associated with the at least one TRS parameter, where the range parameter indicates a range of values available for the dynamic TRS parameter.

Figure 13:
FIG. 13 shows a diagram of a system including a device that supports dynamic indication of TRS in accordance with one or more aspects of the present disclosure.

FIG. 13 shows a diagram of a system 1300 including a device 1305 that supports dynamic indication of TRS in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting dynamic indication of TRS). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting one or more TRS parameters configured for a UE to perform channel measurements associated with one or more TRSs transmitted to the UE. The communications manager 1320 may be configured as or otherwise support a means for transmitting a dynamic paging indicator message that indicates a set of updated TRS parameters including at least one TRS parameter that is different from the one or more TRS parameters. The communications manager 1320 may be configured as or otherwise support a means for transmitting the one or more TRSs. The communications manager 1320 may be configured as or otherwise support a means for receiving a CMR in accordance with the set of updated TRS parameters.

Additionally, or alternatively, the communications manager 1320 may support wireless communication at a network entity in accordance with examples as disclosed herein. For example, the communications manager 1320 may be configured as or otherwise support a means for transmitting one or more TRS parameters configured for a UE to perform channel measurements associated with one or more TRSs transmitted to UE. The communications manager 1320 may be configured as or otherwise support a means for transmitting an indication that at least one TRS parameter of the one or more TRS parameters is configured as a dynamic TRS parameter. The communications manager 1320 may be configured as or otherwise support a means for transmitting the one or more TRSs. The communications manager 1320 may be configured as or otherwise support a means for receiving a CMR based on a set of updated TRS parameters including at least the dynamic TRS parameter.

By including or configuring the communications manager 1320 in accordance with examples as described herein, the device 1305 may support techniques for dynamic indication of TRS, which may include advantages such as improved communication reliability, reduced latency, improved user experience related to reduced processing, reduced power consumption at the UE and network entity, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of dynamic indication of TRS as described herein, or the processor 1335 and the memory 1325 may be otherwise configured to perform or support such operations.

FIG. 14 shows a flowchart illustrating a method 1400 that supports dynamic indication of TRS in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving one or more TRS parameters configured for the UE to perform channel measurements associated with one or more TRSs received by the UE operating in a first operation mode. The operations of 1405 may be performed in accordance with examples as disclosed herein. In some examples, aspects of the operations of 1405 may be performed by an TRS parameter receiving component 825 as described with reference to FIG. 8.

At 1410, the method may include receiving a dynamic paging indicator message that indicates a set of updated TRS parameters including at least one TRS parameter that is different from the one or more TRS parameters. The operations of 1410 may be performed in accordance with examples as disclosed herein. In some examples, aspects of the operations of 1410 may be performed by a dynamic paging indicator receiving component 830 as described with reference to FIG. 8.

At 1415, the method may include receiving the one or more TRSs. The operations of 1415 may be performed in accordance with examples as disclosed herein. In some examples, aspects of the operations of 1415 may be performed by an TRS receiving component 835 as described with reference to FIG. 8.

At 1420, the method may include performing the channel measurements in accordance with the set of updated TRS parameters. The operations of 1420 may be performed in accordance with examples as disclosed herein. In some examples, aspects of the operations of 1420 may be performed by a channel measurement component 840 as described with reference to FIG. 8.

FIG. 15 shows a flowchart illustrating a method 1500 that supports dynamic indication of TRS in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving one or more TRS parameters configured for the UE to perform channel measurements associated with one or more TRSs received by the UE operating in a first operation mode. The operations of 1505 may be performed in accordance with examples as disclosed herein. In some examples, aspects of the operations of 1505 may be performed by an TRS parameter receiving component 825 as described with reference to FIG. 8.

At 1510, the method may include receiving a dynamic paging indicator message that indicates a set of updated TRS parameters including at least one TRS parameter that is different from the one or more TRS parameters. The operations of 1510 may be performed in accordance with examples as disclosed herein. In some examples, aspects of the operations of 1510 may be performed by a dynamic paging indicator receiving component 830 as described with reference to FIG. 8.

At 1515, the method may include receiving an indication of a TRS resource set that corresponds to the set of updated TRS parameters, the indication including a TRS resource set identifier, a TRS resource set group identifier, a beam identifier, a TCI state identifier, or any combination thereof. The operations of 1515 may be performed in accordance with examples as disclosed herein. In some examples, aspects of the operations of 1515 may be performed by a dynamic paging indicator receiving component 830 as described with reference to FIG. 8.

At 1520, the method may include receiving the one or more TRSs. The operations of 1520 may be performed in accordance with examples as disclosed herein. In some examples, aspects of the operations of 1520 may be performed by an TRS receiving component 835 as described with reference to FIG. 8.

At 1525, the method may include performing the channel measurements in accordance with the set of updated TRS parameters. The operations of 1525 may be performed in accordance with examples as disclosed herein. In some examples, aspects of the operations of 1525 may be performed by a channel measurement component 840 as described with reference to FIG. 8.

FIG. 16 shows a flowchart illustrating a method 1600 that supports dynamic indication of TRS in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving one or more TRS parameters configured for the UE to perform channel measurements associated with one or more TRSs received by the UE operating in a first operation mode. The operations of 1605 may be performed in accordance with examples as disclosed herein. In some examples, aspects of the operations of 1605 may be performed by an TRS parameter receiving component 825 as described with reference to FIG. 8.

At 1610, the method may include receiving a dynamic paging indicator message that indicates a set of updated TRS parameters including at least one TRS parameter that is different from the one or more TRS parameters. The operations of 1610 may be performed in accordance with examples as disclosed herein. In some examples, aspects of the operations of 1610 may be performed by a dynamic paging indicator receiving component 830 as described with reference to FIG. 8.

At 1615, the method may include receiving an indication of the set of updated TRS parameters, the set of updated TRS parameters including an updated power level of the one or more TRSs, an updated time domain allocation of the one or more TRSs, an updated frequency domain allocation of the one or more TRSs, or any combination thereof, for the at least one TRS parameter. The operations of 1615 may be performed in accordance with examples as disclosed herein. In some examples, aspects of the operations of 1615 may be performed by a dynamic paging indicator receiving component 830 as described with reference to FIG. 8.

At 1620, the method may include receiving the one or more TRSs. The operations of 1620 may be performed in accordance with examples as disclosed herein. In some examples, aspects of the operations of 1620 may be performed by an TRS receiving component 835 as described with reference to FIG. 8.

At 1625, the method may include performing the channel measurements in accordance with the set of updated TRS parameters. The operations of 1625 may be performed in accordance with examples as disclosed herein. In some examples, aspects of the operations of 1625 may be performed by a channel measurement component 840 as described with reference to FIG. 8.

FIG. 17 shows a flowchart illustrating a method 1700 that supports dynamic indication of TRS in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving one or more TRS parameters configured for the UE to perform channel measurements associated with one or more TRSs received by the UE operating in a first operation mode. The operations of 1705 may be performed in accordance with examples as disclosed herein. In some examples, aspects of the operations of 1705 may be performed by an TRS parameter receiving component 825 as described with reference to FIG. 8.

At 1710, the method may include receiving an indication that at least one TRS parameter of the one or more TRS parameters is configured as the dynamic TRS parameter. The operations of 1710 may be performed in accordance with examples as disclosed herein. In some examples, aspects of the operations of 1710 may be performed by a dynamic TRS parameter receiving component 845 as described with reference to FIG. 8.

At 1715, the method may include receiving the one or more TRSs and performing the channel measurements based on a set of updated TRS parameters including at least the dynamic TRS parameter. The operations of 1715 may be performed in accordance with examples as disclosed herein. In some examples, aspects of the operations of 1715 may be performed by an TRS receiving component 835 as described with reference to FIG. 8.

FIG. 18 shows a flowchart illustrating a method 1800 that supports dynamic indication of TRS in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving one or more TRS parameters configured for the UE to perform channel measurements associated with one or more TRSs received by the UE operating in a first operation mode. The operations of 1805 may be performed in accordance with examples as disclosed herein. In some examples, aspects of the operations of 1805 may be performed by an TRS parameter receiving component 825 as described with reference to FIG. 8.

At 1810, the method may include receiving an indication that at least one TRS parameter of the one or more TRS parameters is configured as the dynamic TRS parameter. The operations of 1810 may be performed in accordance with examples as disclosed herein. In some examples, aspects of the operations of 1810 may be performed by a dynamic TRS parameter receiving component 845 as described with reference to FIG. 8.

At 1815, the method may include receiving one or more bits that correspond to the at least one TRS parameter, where the one or more bits indicate whether the at least one TRS parameter is configured as the dynamic TRS parameter. The operations of 1815 may be performed in accordance with examples as disclosed herein. In some examples, aspects of the operations of 1815 may be performed by a dynamic TRS parameter receiving component 845 as described with reference to FIG. 8.

At 1820, the method may include receiving the one or more TRSs and performing the channel measurements based on a set of updated TRS parameters including at least the dynamic TRS parameter. The operations of 1820 may be performed in accordance with examples as disclosed herein. In some examples, aspects of the operations of 1820 may be performed by an TRS receiving component 835 as described with reference to FIG. 8.

FIG. 19 shows a flowchart illustrating a method 1900 that supports dynamic indication of TRS in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting one or more TRS parameters configured for a UE to perform channel measurements associated with one or more TRSs transmitted to the UE. The operations of 1905 may be performed in accordance with examples as disclosed herein. In some examples, aspects of the operations of 1905 may be performed by an TRS parameter transmission component 1225 as described with reference to FIG. 12.

At 1910, the method may include transmitting a dynamic paging indicator message that indicates a set of updated TRS parameters including at least one TRS parameter that is different from the one or more TRS parameters. The operations of 1910 may be performed in accordance with examples as disclosed herein. In some examples, aspects of the operations of 1910 may be performed by a dynamic paging indicator transmission component 1230 as described with reference to FIG. 12.

At 1915, the method may include transmitting the one or more TRSs. The operations of 1915 may be performed in accordance with examples as disclosed herein. In some examples, aspects of the operations of 1915 may be performed by an TRS transmission component 1235 as described with reference to FIG. 12.

At 1920, the method may include receiving a CMR in accordance with the set of updated TRS parameters. The operations of 1920 may be performed in accordance with examples as disclosed herein. In some examples, aspects of the operations of 1920 may be performed by an CMR receiving component 1240 as described with reference to FIG. 12.

Figure 20:
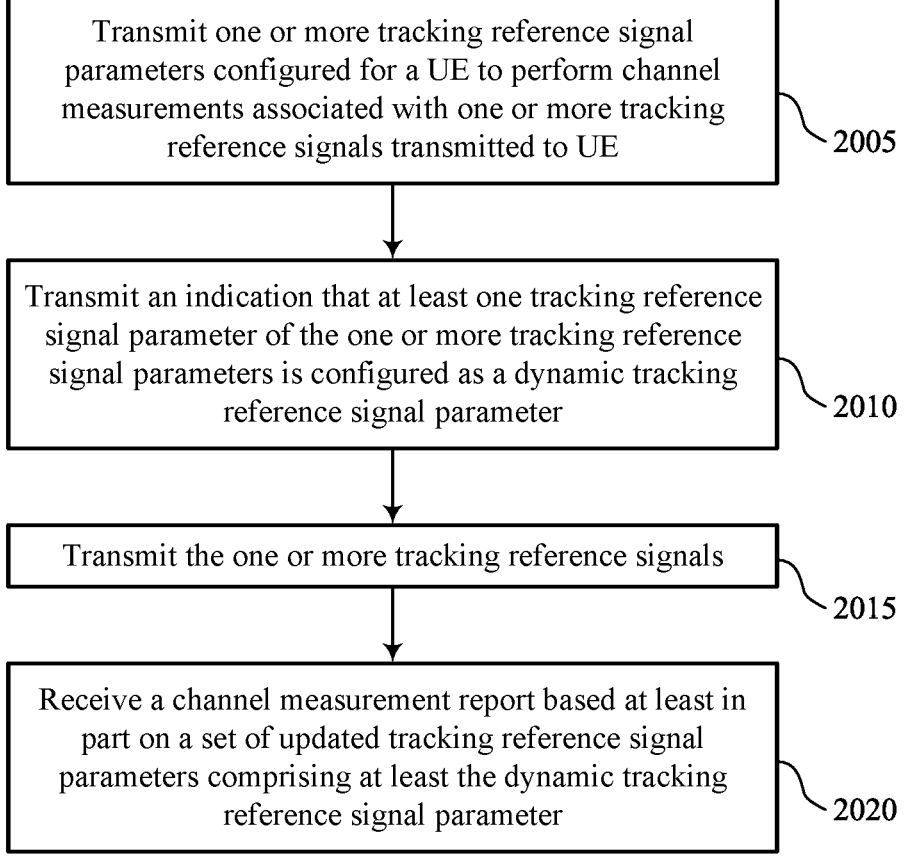

FIG. 20 shows a flowchart illustrating a method 2000 that supports dynamic indication of TRS in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting one or more TRS parameters configured for a UE to perform channel measurements associated with one or more TRSs transmitted to UE. The operations of 2005 may be performed in accordance with examples as disclosed herein. In some examples, aspects of the operations of 2005 may be performed by an TRS parameter transmission component 1225 as described with reference to FIG. 12.

At 2010, the method may include transmitting an indication that at least one TRS parameter of the one or more TRS parameters is configured as the dynamic TRS parameter. The operations of 2010 may be performed in accordance with examples as disclosed herein. In some examples, aspects of the operations of 2010 may be performed by a dynamic TRS indication transmission component 1245 as described with reference to FIG. 12.

At 2015, the method may include transmitting the one or more TRSs. The operations of 2015 may be performed in accordance with examples as disclosed herein. In some examples, aspects of the operations of 2015 may be performed by an TRS transmission component 1235 as described with reference to FIG. 12.

At 2020, the method may include receiving a CMR based on a set of updated TRS parameters including at least the dynamic TRS parameter. The operations of 2020 may be performed in accordance with examples as disclosed herein. In some examples, aspects of the operations of 2020 may be performed by an CMR receiving component 1240 as described with reference to FIG. 12.

The following provides an overview of aspects of the present disclosure:

Aspect 1: A method for wireless communication at a UE, comprising: receiving one or more TRS parameters configured for the UE to perform channel measurements associated with one or more TRSs received by the UE operating in a first operation mode; receiving a dynamic paging indicator message that indicates a set of updated TRS parameters comprising at least one TRS parameter that is different from the one or more TRS parameters; receiving the one or more TRSs; and performing the channel measurements in accordance with the set of updated TRS parameters.

Aspect 2: The method of aspect 1, wherein receiving the dynamic paging indicator message further comprises: receiving an indication of a TRS resource set that corresponds to the set of updated TRS parameters, the indication comprising a TRS resource set identifier, a TRS resource set group identifier, a beam identifier, a TCI state identifier, or any combination thereof.

Aspect 3: The method of any of aspects 1 through 2, wherein receiving the dynamic paging indicator message further comprises: receiving an indication of the set of updated TRS parameters, the set of updated TRS parameters comprising an updated power level of the one or more TRSs, an updated time domain allocation of the one or more TRSs, an updated frequency domain allocation of the one or more TRSs, or any combination thereof, for the at least one TRS parameter.

Aspect 4: The method of any of aspects 1 through 3, wherein receiving the dynamic paging indicator message further comprises: receiving, via a bitmap, an indication of a TRS resource set that corresponds to the set of updated TRS parameters comprising the at least one TRS parameter that is different from the one or more TRS parameters.

Aspect 5: The method of aspect 4, wherein a first bit of the bitmap corresponds to the at least one TRS parameter that is different from the one or more TRS parameters, and a second bit of the bitmap indicates the TRS resource set that includes the at least one TRS parameter.

Aspect 6: The method of any of aspects 1 through 5, wherein receiving the dynamic paging indicator message further comprises: receiving, via a list, an indication of a TRS resource set that corresponds to the set of updated TRS parameters comprising the at least one TRS parameter that is different from the one or more TRS parameters.

Aspect 7: The method of aspect 6, wherein each row of the list comprises a first set of bits that indicate the TRS resource set that includes the at least one TRS parameter, and a second set of bits that indicates the at least one TRS parameter that is different from the one or more TRS parameters.

Aspect 8: The method of any of aspects 1 through 7, further comprising: receiving the dynamic paging indicator message before a paging occasion of a DRX cycle of the UE.

Aspect 9: The method of any of aspects 1 through 8, wherein the first operation mode comprises an idle operation mode or an inactive operation mode, the method further comprising: receiving the dynamic paging indicator message via a paging early indication message, a paging DCI message, or both.

Aspect 10: The method of any of aspects 1 through 9, wherein the first operation mode comprises a connected mode, the method further comprising: receiving the dynamic paging indicator message via a unicast DCI message, a group-common DCI message, a multicast MAC-CE, a unicast MAC-CE, or any combination thereof.

Aspect 11: A method for wireless communication at a UE, comprising: receiving one or more TRS parameters configured for the UE to perform channel measurements associated with one or more TRSs received by the UE operating in a first operation mode; receiving an indication that at least one TRS parameter of the one or more TRS parameters is configured as a dynamic TRS parameter; and receiving the one or more TRSs and performing the channel measurements based at least in part on a set of updated TRS parameters comprising at least the dynamic TRS parameter.

Aspect 12: The method of aspect 11, further comprising: receiving one or more bits that correspond to the at least one TRS parameter, wherein the one or more bits indicate whether the at least one TRS parameter is configured as the dynamic TRS parameter.

Aspect 13: The method of any of aspects 11 through 12, wherein receiving the indication further comprises: receiving a validity parameter associated with the at least one TRS parameter, wherein the validity parameter indicates a duration of time that the at least one TRS parameter is configured as the dynamic TRS parameter.

Aspect 14: The method of any of aspects 11 through 13, wherein receiving the indication further comprises: receiving a range parameter associated with the at least one TRS parameter, wherein the range parameter indicates a range of values available for the dynamic TRS parameter.

Aspect 15: The method of any of aspects 11 through 14, wherein receiving the one or more TRSs and performing the channel measurements further comprises: performing one or more power delay profile measurements by excluding one or more measurements associated with the dynamic TRS parameter.

Aspect 16: The method of any of aspects 11 through 15, wherein the dynamic TRS parameter indicates a change in a power level of one or more the one or more TRSs.

Aspect 17: The method of any of aspects 11 through 16, further comprising: receiving the indication of the dynamic TRS parameter via a system information block.

Aspect 18: The method of any of aspects 11 through 17, further comprising: receiving the indication of the dynamic TRS parameter via a RRC message.

Aspect 19: A method for wireless communication at a network entity, comprising: transmitting one or more TRS parameters configured for a UE to perform channel measurements associated with one or more TRSs transmitted to the UE; transmitting a dynamic paging indicator message that indicates a set of updated TRS parameters comprising at least one TRS parameter that is different from the one or more TRS parameters; transmitting the one or more TRSs; and receiving a CMR in accordance with the set of updated TRS parameters.

Aspect 20: The method of aspect 19, wherein transmitting the dynamic paging indicator message further comprises: transmitting an indication of a TRS resource set that corresponds to the set of updated TRS parameters, the indication comprising a TRS resource set identifier, a TRS resource set group identifier, a beam identifier, a TCI state identifier, or any combination thereof.

Aspect 21: The method of any of aspects 19 through 20, wherein transmitting the dynamic paging indicator message further comprises: transmitting an indication of the set of updated TRS parameters, the set of updated TRS parameters comprising an updated power level of the one or more TRSs, an updated time domain allocation of the one or more TRSs, an updated frequency domain allocation of the one or more TRSs, or any combination thereof, for the at least one TRS parameter.

Aspect 22: The method of any of aspects 19 through 21, wherein transmitting the dynamic paging indicator message further comprises: transmitting, via a bitmap, an indication of a TRS resource set that corresponds to the set of updated TRS parameters comprising the at least one TRS parameter that is different from the one or more TRS parameters.

Aspect 23: The method of aspect 22, wherein a first bit of the bitmap corresponds to the at least one TRS parameter that is different from the one or more TRS parameters, and a second bit of the bitmap indicates the TRS resource set that includes the at least one TRS parameter.

Aspect 24: The method of any of aspects 19 through 23, wherein transmitting the dynamic paging indicator message further comprises: transmitting, via a list, an indication of a TRS resource set that corresponds to the set of updated TRS parameters comprising the at least one TRS parameter that is different from the one or more TRS parameters.

Aspect 25: The method of aspect 24, wherein each row of the list comprises a first set of bits that indicate the TRS resource set that includes the at least one TRS parameter, and a second set of bits that indicates the at least one TRS parameter that is different from the one or more TRS parameters.

Aspect 26: The method of any of aspects 19 through 25, further comprising: transmitting the dynamic paging indicator message via a paging early indication message, a paging DCI message, a unicast DCI message, a group-common DCI message, a multicast MAC-CE, a unicast MAC-CE, or any combination thereof.

Aspect 27: A method for wireless communication at a network entity, comprising: transmitting one or more TRS parameters configured for a UE to perform channel measurements associated with one or more TRSs transmitted to UE; transmitting an indication that at least one TRS parameter of the one or more TRS parameters is configured as a dynamic TRS parameter; transmitting the one or more TRSs; and receiving a CMR based at least in part on a set of updated TRS parameters comprising at least the dynamic TRS parameter.

Aspect 28: The method of aspect 27, further comprising: transmitting one or more bits that correspond to the at least one TRS parameter, wherein the one or more bits indicate whether the at least one TRS parameter is configured as the dynamic TRS parameter.

Aspect 29: The method of any of aspects 27 through 28, wherein transmitting the indication further comprises: transmitting a validity parameter associated with the at least one TRS parameter, wherein the validity parameter indicates a duration of time that the at least one TRS parameter is configured as the dynamic TRS parameter.

Aspect 30: The method of any of aspects 27 through 29, wherein transmitting the indication further comprises: transmitting a range parameter associated with the at least one TRS parameter, wherein the range parameter indicates a range of values available for the dynamic TRS parameter.

Aspect 31: An apparatus for wireless communication at a UE, comprising at least one processor, and memory coupled to the at least one processor, the memory storing instructions executable by the processor to cause the UE to perform a method of any of aspects 1 through 10.

Aspect 32: An apparatus for wireless communication at a UE, comprising at least one means for performing a method of any of aspects 1 through 10.

Aspect 33: A non-transitory computer-readable medium storing code for wireless communication at a UE, the code comprising instructions executable by a processor to perform a method of any of aspects 1 through 10.

Aspect 34: An apparatus for wireless communication at a UE, comprising at least one processor, and memory coupled to the at least one processor, the memory storing instructions executable by the processor to cause the UE to perform a method of any of aspects 11 through 18.

Aspect 35: An apparatus for wireless communication at a UE, comprising at least one means for performing a method of any of aspects 11 through 18.

Aspect 36: A non-transitory computer-readable medium storing code for wireless communication at a UE, the code comprising instructions executable by a processor to perform a method of any of aspects 11 through 18.

Aspect 37: An apparatus for wireless communication at a network entity, comprising at least one processor, and memory coupled to the at least one processor, the memory storing instructions executable by the processor to cause the network entity to perform a method of any of aspects 19 through 26.

Aspect 38: An apparatus for wireless communication at a network entity, comprising at least one means for performing a method of any of aspects 19 through 26.

Aspect 39: A non-transitory computer-readable medium storing code for wireless communication at a network entity, the code comprising instructions executable by a processor to perform a method of any of aspects 19 through 26.

Aspect 40: An apparatus for wireless communication at a network entity, comprising at least one processor, and memory coupled to the at least one processor, the memory storing instructions executable by the processor to cause the network entity to perform a method of any of aspects 27 through 30.

Aspect 41: An apparatus for wireless communication at a network entity, comprising at least one means for performing a method of any of aspects 27 through 30.

Aspect 42: A non-transitory computer-readable medium storing code for wireless communication at a network entity, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled with the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended FIGURES, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

at least one processor; and at least one memory coupled to the at least one processor, the at least one memory storing instructions executable by the at least one processor to cause the UE to:

receive one or more tracking reference signal parameters configured for the UE to perform channel measurements associated with one or more tracking reference signals received by the UE operating in a first operation mode;

receive a dynamic paging indicator message that indicates a set of updated tracking reference signal parameters comprising at least one tracking reference signal parameter that is different from the one or more tracking reference signal parameters;

receive the one or more tracking reference signals; and transmit, responsive to the dynamic paging indicator message, a channel measurement report including channel measurements that are in accordance with the set of updated tracking reference signal parameters.

2. The apparatus of claim 1, wherein the instructions to receive the dynamic paging indicator message are further executable by the at least one processor to cause the UE to:

receive an indication of a tracking reference signal resource set that corresponds to the set of updated tracking reference signal parameters, the indication comprising a tracking reference signal resource set identifier, a tracking reference signal resource set group identifier, a beam identifier, a transmission configuration indicator state identifier, or any combination thereof.

3. The apparatus of claim 1, wherein the instructions to receive the dynamic paging indicator message are further executable by the at least one processor to cause the UE to:

receive an indication of the set of updated tracking reference signal parameters, the set of updated tracking reference signal parameters comprising an updated power level of the one or more tracking reference signals, an updated time domain allocation of the one or more tracking reference signals, an updated frequency domain allocation of the one or more tracking reference signals, or any combination thereof, for the at least one tracking reference signal parameter.

4. The apparatus of claim 1, wherein the instructions to receive the dynamic paging indicator message are further executable by the at least one processor to cause the UE to:

receive, via a bitmap, an indication of a tracking reference signal resource set that corresponds to the set of updated tracking reference signal parameters comprising the at least one tracking reference signal parameter that is different from the one or more tracking reference signal parameters.

5. The apparatus of claim 4, wherein a first bit of the bitmap corresponds to the at least one tracking reference signal parameter that is different from the one or more tracking reference signal parameters, and a second bit of the bitmap indicates the tracking reference signal resource set that includes the at least one tracking reference signal parameter.

6. The apparatus of claim 1, wherein the instructions to receive the dynamic paging indicator message are further executable by the at least one processor to cause the UE to:

receive, via a list, an indication of a tracking reference signal resource set that corresponds to the set of updated tracking reference signal parameters comprising the at least one tracking reference signal parameter that is different from the one or more tracking reference signal parameters.

7. The apparatus of claim 6, wherein each row of the list comprises a first set of bits that indicate the tracking reference signal resource set that includes the at least one tracking reference signal parameter, and a second set of bits that indicates the at least one tracking reference signal parameter that is different from the one or more tracking reference signal parameters.

8. The apparatus of claim 1, wherein the instructions are further executable by the at least one processor to cause the UE to:

receive the dynamic paging indicator message before a paging occasion of a discontinuous reception cycle of the UE.

9. The apparatus of claim 1, wherein the first operation mode comprises an idle operation mode or an inactive operation mode, and the instructions are further executable by the at least one processor to cause the UE to:

receive the dynamic paging indicator message via a paging early indication message, a paging downlink control information message, or both.

10. The apparatus of claim 1, wherein the first operation mode comprises a connected mode, and the instructions are further executable by the at least one processor to cause the UE to:

receive the dynamic paging indicator message via a unicast downlink control information message, a group-common downlink control information message, a multicast medium access control-control element, a unicast medium access control-control element, or any combination thereof.

11. An apparatus for wireless communication at a user equipment (UE), comprising:

at least one processor; and at least one memory coupled to the at least one processor, the at least one memory storing instructions executable by the at least one processor to cause the UE to:

receive one or more tracking reference signal parameters configured for the UE to perform channel measurements associated with one or more tracking reference signals received by the UE operating in a first operation mode;

receive an indication that at least one tracking reference signal parameter of the one or more tracking reference signal parameters is configured as a dynamic tracking reference signal parameter;

receive the one or more tracking reference signals; and transmit, responsive to the indication of the dynamic tracking reference signal parameter, a channel measurement report including channel measurements that are based at least in part on a set of updated tracking reference signal parameters comprising at least the dynamic tracking reference signal parameter.

12. The apparatus of claim 11, wherein the instructions are further executable by the at least one processor to cause the UE to:

receive one or more bits that correspond to the at least one tracking reference signal parameter, wherein the one or more bits indicate whether the at least one tracking reference signal parameter is configured as the dynamic tracking reference signal parameter.

13. The apparatus of claim 11, wherein the instructions to receive the indication are further executable by the at least one processor to cause the UE to:

receive a validity parameter associated with the at least one tracking reference signal parameter, wherein the validity parameter indicates a duration of time that the at least one tracking reference signal parameter is configured as the dynamic tracking reference signal parameter.

14. The apparatus of claim 11, wherein the instructions to receive the indication are further executable by the at least one processor to cause the UE to:

receive a range parameter associated with the at least one tracking reference signal parameter, wherein the range parameter indicates a range of values available for the dynamic tracking reference signal parameter.

15. The apparatus of claim 11, wherein the instructions to receive the one or more tracking reference signals and perform the channel measurements are further executable by the at least one processor to cause the UE to:

perform one or more power delay profile measurements by excluding one or more measurements associated with the dynamic tracking reference signal parameter.

16. The apparatus of claim 11, wherein the dynamic tracking reference signal parameter indicates a change in a power level of one or more the one or more tracking reference signals.

17. The apparatus of claim 11, wherein the instructions are further executable by the at least one processor to cause the UE to:

receive the indication of the dynamic tracking reference signal parameter via a system information block.

18. The apparatus of claim 11, wherein the instructions are further executable by the at least one processor to cause the UE to:

receive the indication of the dynamic tracking reference signal parameter via a radio resource control message.

19. An apparatus for wireless communication at a network entity, comprising:

at least one processor; and at least one memory coupled to the at least one processor, the at least one memory storing instructions executable by the at least one processor to cause the network entity to:

transmit one or more tracking reference signal parameters configured for a user equipment (UE) to perform channel measurements associated with one or more tracking reference signals transmitted to the UE;

transmit a dynamic paging indicator message that indicates a set of updated tracking reference signal parameters comprising at least one tracking reference signal parameter that is different from the one or more tracking reference signal parameters;

transmit the one or more tracking reference signals; and receive, responsive to the dynamic paging indicator message, a channel measurement report including channel measurements that are in accordance with the set of updated tracking reference signal parameters.

20. The apparatus of claim 19, wherein the instructions to transmit the dynamic paging indicator message are further executable by the at least one processor to cause the network entity to:

transmit an indication of a tracking reference signal resource set that corresponds to the set of updated tracking reference signal parameters, the indication comprising a tracking reference signal resource set identifier, a tracking reference signal resource set group identifier, a beam identifier, a transmission configuration indicator state identifier, or any combination thereof.

21. The apparatus of claim 19, wherein the instructions to transmit the dynamic paging indicator message are further executable by the at least one processor to cause the network entity to:

transmit an indication of the set of updated tracking reference signal parameters, the set of updated tracking reference signal parameters comprising an updated power level of the one or more tracking reference signals, an updated time domain allocation of the one or more tracking reference signals, an updated frequency domain allocation of the one or more tracking reference signals, or any combination thereof, for the at least one tracking reference signal parameter.

22. The apparatus of claim 19, wherein the instructions to transmit the dynamic paging indicator message are further executable by the at least one processor to cause the network entity to:

transmit, via a bitmap, an indication of a tracking reference signal resource set that corresponds to the set of updated tracking reference signal parameters comprising the at least one tracking reference signal parameter that is different from the one or more tracking reference signal parameters.

23. The apparatus of claim 22, wherein a first bit of the bitmap corresponds to the at least one tracking reference signal parameter that is different from the one or more tracking reference signal parameters, and a second bit of the bitmap indicates the tracking reference signal resource set that includes the at least one tracking reference signal parameter.

24. The apparatus of claim 19, wherein the instructions to transmit the dynamic paging indicator message are further executable by the at least one processor to cause the network entity to:

transmit, via a list, an indication of a tracking reference signal resource set that corresponds to the set of updated tracking reference signal parameters comprising the at least one tracking reference signal parameter that is different from the one or more tracking reference signal parameters.

25. The apparatus of claim 24, wherein each row of the list comprises a first set of bits that indicate the tracking reference signal resource set that includes the at least one tracking reference signal parameter, and a second set of bits that indicates the at least one tracking reference signal parameter that is different from the one or more tracking reference signal parameters.

26. The apparatus of claim 19, wherein the instructions are further executable by the at least one processor to cause the network entity to:

transmit the dynamic paging indicator message via a paging early indication message, a paging downlink control information message, a unicast downlink control information message, a group-common downlink control information message, a multicast medium access control-control element, a unicast medium access control-control element, or any combination thereof.

27. An apparatus for wireless communication at a network entity, comprising:

at least one processor; and at least one memory coupled to the at least one processor, the at least one memory storing instructions executable by the at least one processor to cause the network entity to:

transmit one or more tracking reference signal parameters configured for a user equipment (UE) to perform channel measurements associated with one or more tracking reference signals transmitted to UE;

transmit an indication that at least one tracking reference signal parameter of the one or more tracking reference signal parameters is configured as a dynamic tracking reference signal parameter;

transmit the one or more tracking reference signals; and receive, responsive to the indication of the dynamic tracking reference signal parameter, a channel measurement report including channel measurements that are based at least in part on a set of updated tracking reference signal parameters comprising at least the dynamic tracking reference signal parameter.

28. The apparatus of claim 27, wherein the instructions are further executable by the at least one processor to cause the network entity to:

transmit one or more bits that correspond to the at least one tracking reference signal parameter, wherein the one or more bits indicate whether the at least one tracking reference signal parameter is configured as the dynamic tracking reference signal parameter.

29. The apparatus of claim 27, wherein the instructions to transmit the indication are further executable by the at least one processor to cause the network entity to:

transmit a validity parameter associated with the at least one tracking reference signal parameter, wherein the validity parameter indicates a duration of time that the at least one tracking reference signal parameter is configured as the dynamic tracking reference signal parameter.

30. The apparatus of claim 27, wherein the instructions to transmit the indication are further executable by the at least one processor to cause the network entity to:

transmit a range parameter associated with the at least one tracking reference signal parameter, wherein the range parameter indicates a range of values available for the dynamic tracking reference signal parameter.

\* \* \* \* \*